(12) United States Patent
Uno et al.

(10) Patent No.: US 6,991,081 B2
(45) Date of Patent: Jan. 31, 2006

(54) SHIFT AND BREAK CONTROL DEVICE

(75) Inventors: Kouji Uno, Osaka (JP); Kazuhiro Fujii, Kawachinagano (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 10/721,070

(22) Filed: Nov. 26, 2003

(65) Prior Publication Data

US 2005/0109577 A1    May 26, 2005

(51) Int. Cl.
*B25M 25/08* (2006.01)

(52) U.S. Cl. .................. 192/217; 192/226; 74/473.12; 74/473.13

(58) Field of Classification Search ................ 192/217, 192/226; 74/473.12, 473.13; 474/78, 80, 474/82; 280/260, 261, 61.87, 21.88
See application file for complete search history.

(56) References Cited

U.S. PATENT DOCUMENTS

| | | | |
|---|---|---|---|
| 1,208,427 A * | 12/1916 | White .......................... 200/530 |
| 4,065,983 A * | 1/1978 | Mimura ........................ 74/625 |
| 4,143,557 A | 3/1979 | Wakebe et al. |
| 4,900,291 A | 2/1990 | Patterson |
| 5,358,451 A | 10/1994 | Lacombe et al. |
| 5,400,675 A | 3/1995 | Nagano |
| 5,470,277 A | 11/1995 | Romano |
| 5,653,649 A * | 8/1997 | Watarai ........................ 474/78 |
| 5,678,455 A | 10/1997 | Watarai |
| 5,768,945 A | 6/1998 | Ose |
| 5,941,125 A | 8/1999 | Watarai et al. |
| 6,015,036 A | 1/2000 | Fukuda |
| 6,031,190 A * | 2/2000 | Tokuda et al. ............. 200/11 R |
| 6,038,923 A | 3/2000 | Lin |
| 6,073,730 A | 6/2000 | Abe |
| 6,216,078 B1 | 4/2001 | Jinbo et al. |
| 6,227,068 B1 | 5/2001 | Masui et al. |
| 6,467,786 B2 * | 10/2002 | Horiuchi ...................... 280/260 |
| 6,546,827 B2 | 4/2003 | Irie |
| 6,698,307 B2 | 3/2004 | Wesling et al. |
| 6,698,567 B2 * | 3/2004 | Dal Pra' ...................... 192/217 |
| 2001/0053724 A1 | 12/2001 | Campagnolo |
| 2003/0019712 A1 | 1/2003 | Dal Pra' |

(Continued)

FOREIGN PATENT DOCUMENTS

DE    19642906 A1    4/1997

(Continued)

OTHER PUBLICATIONS

Mavic All Catalogue 1999, Published in Japan before Nov. 5, 1998.

*Primary Examiner*—Richard M. Lorence
(74) *Attorney, Agent, or Firm*—Shinjyu Global IP Counselors, LLP

(57) ABSTRACT

A shift and brake control device is configured to combine an electrical shift operating device and a cable operated brake operating device. The control device basically has a brake lever bracket with a pivotally mounted brake lever moveably coupled to the brake lever bracket to move between a rest position and a braking position along a brake operating plane, and at least one an electrical shift control switch. The electrical shift control switch is either fixedly mounted to the brake lever or the brake lever bracket. When two electrical shift control switches are used, the electrical shift control switches are mounted to both the brake lever and the brake lever bracket. In some embodiments, the electrical shift control switch has a rotating operating member, while other embodiments have a sliding operating member.

46 Claims, 12 Drawing Sheets

U.S. PATENT DOCUMENTS

2003/0074997 A1    4/2003    Wesling et al.

FOREIGN PATENT DOCUMENTS

| EP | 1225123 A1 | 7/2002 |
|---|---|---|
| EP | 1375325 A2 | 1/2004 |
| FR | 2 654 698 A1 | 5/1991 |
| JP | 60-85297 U | 6/1985 |
| JP | 5338581 | 12/1993 |

* cited by examiner

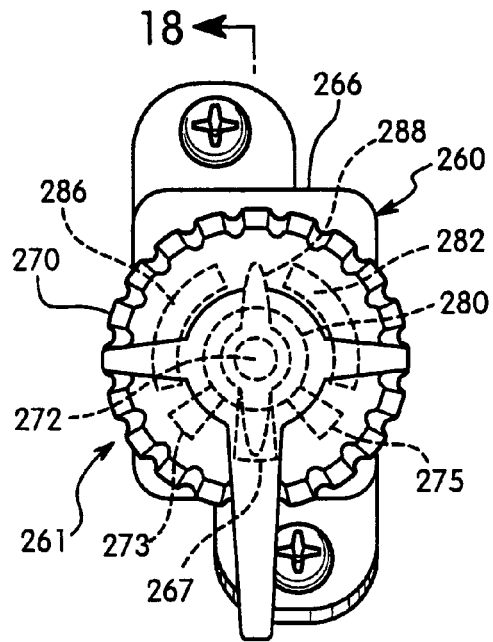
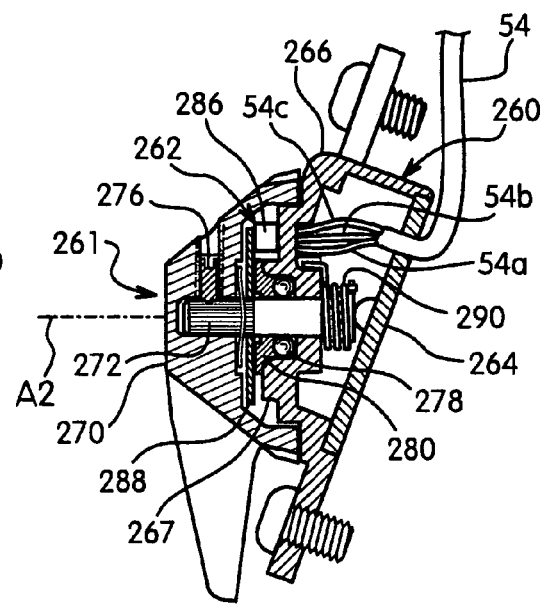
Fig. 17    Fig. 18
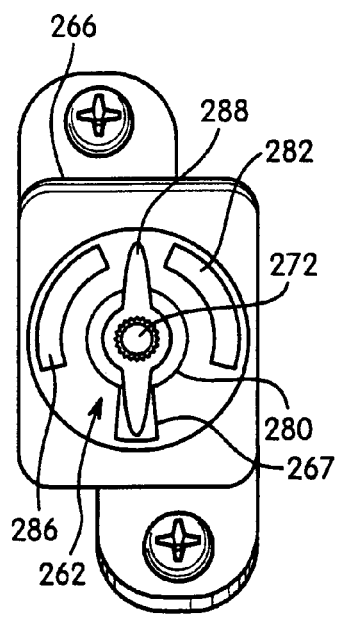 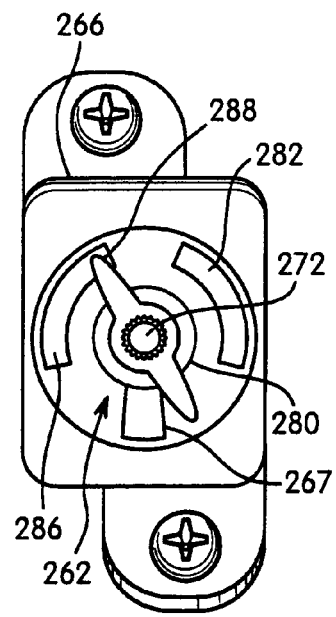 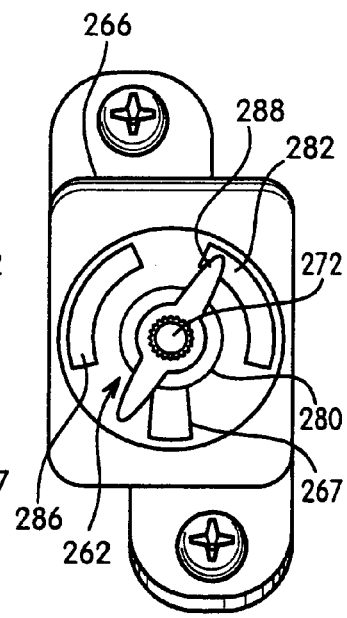
Fig. 19    Fig. 20    Fig. 21

SHIFT AND BREAK CONTROL DEVICE

BACKGROUND OF THE INVENTION

1. Field of the Invention

This invention generally relates to an electrical shift and brake control device for a bicycle transmission. More specifically, the present invention relates to an electrical shift and brake control device that combines an electrical shift control device and a cable operated brake operating device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle shifting mechanism.

In the past, the operating force applied by the fingers to a shift control lever was transmitted to the drive component of a bicycle shifting mechanism by a cable that was fixed at one end to the control lever. More recently, electric switches mounted on the handlebar have been used instead of control levers in order to operate the bicycle shifting mechanism. For example, as shown in Japanese Laid-Open Patent Application No. 5-338581 and U.S. Pat. No. 5,358,451, a plurality of electric switches may be provided to a plurality of handlebar locations in order to allow for quicker shifts and to enhance responsiveness. However, the operation of the shifter and the operation of the brakes are often related to one another, and it is often inconvenient to move the hands around the handlebar to operate the brakes and then shift the bicycle transmission.

In view of the above, it will be apparent to those skilled in the art from this disclosure that there exists a need for an improved electrical shift and brake control device. This invention addresses this need in the art as well as other needs, which will become apparent to those skilled in the art from this disclosure.

SUMMARY OF THE INVENTION

One object of the present invention is to provide a control device that combines both shifting and braking operations into a single control device that is easy to operate.

Another object of the present invention is to provide a compact and inexpensive bicycle control device that allows the rider to carry out braking and speed change operations without difficulty.

In accordance with one aspect of the invention, an electrical shift and brake control device is provided that basically comprises a brake lever bracket, a brake lever and an electrical shift control switch. The brake lever bracket is configured to be mounted to a handlebar, the brake lever bracket including an inner side wall, an outer side wall, a front wall and a bottom wall. The brake lever is coupled to the brake lever bracket. The electrical shift control switch is fixedly mounted to at least one of the inner side wall, the outer side wall, the front wall and the bottom wall of the brake lever bracket. The electrical shift control switch includes an operating member that is arranged and configured to move relative to the brake lever bracket between a first actuating position and a second actuating position.

In accordance with another aspect of the invention, an electrical shift and brake control device is provided that basically comprises a brake lever bracket, a brake lever and an electrical shift control switch. The brake lever bracket is configured to be mounted to a handlebar. The brake lever is coupled to the brake lever bracket along a brake operating plane. The electrical shift control switch includes an operating member. The electrical shift control switch being at least one of: mounted to the brake lever with the operating member of the electrical shift control switch arranged and configured to rotate relative to the brake lever about a first rotationally operating axis that is not perpendicular to the brake operating plane; and mounted to the brake lever bracket with the operating member of the electrical shift control switch arranged and configured to rotate relative to the brake lever bracket about a second rotationally operating axis that is not parallel to the brake operating plane.

In accordance with another aspect of the invention, an electrical shift and brake control device is provided that basically comprises a brake lever bracket, a brake lever and an electrical shift control switch. The brake lever bracket is configured to be mounted to a handlebar. The brake lever bracket includes an inner lateral side wall. The brake lever is coupled to the brake lever bracket. The electrical shift control switch including an operating member, the electrical shift control switch being at least one of: mounted to the brake lever with the operating member of the electrical shift control switch arranged and configured to move in a linear sliding manner between a first relative position and a second relative position; and mounted to the brake lever bracket with the operating member of the electrical shift control switch arranged and configured to move in a linear sliding manner relative to the brake lever bracket between a first actuating position and a second actuating position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 17 is an elevational view of the electrical shift control switch in accordance with the second embodiment of the present invention;

FIG. 18 is a longitudinal cross sectional view of the electrical shift control switch illustrated in FIG. 17 as seen along section line 18—18 of FIG. 17;

FIG. 19 is an elevational view of the electrical shift control switch illustrated in FIGS. 17 and 18 with the knob removed to shown the electrical shift control switch in the neutral position, i.e., the movable contacts spaced from the stationary contacts so that no electrical connection is made between the contacts;

FIG. 20 is an elevational view of the electrical shift control switch illustrated in FIGS. 17–19 with the knob removed to shown the electrical shift control switch in the upshift position, i.e., one of the movable contacts one of the stationary contacts so that an electrical connection is established between the contacts;

FIG. 21 is an elevational view of the electrical shift control switch illustrated in FIGS. 17–20 with the cover and dial removed to shown the electrical shift control switch in the downshift position, i.e., one of the movable contacts one of the stationary contacts so that an electrical connection is established between the contacts;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
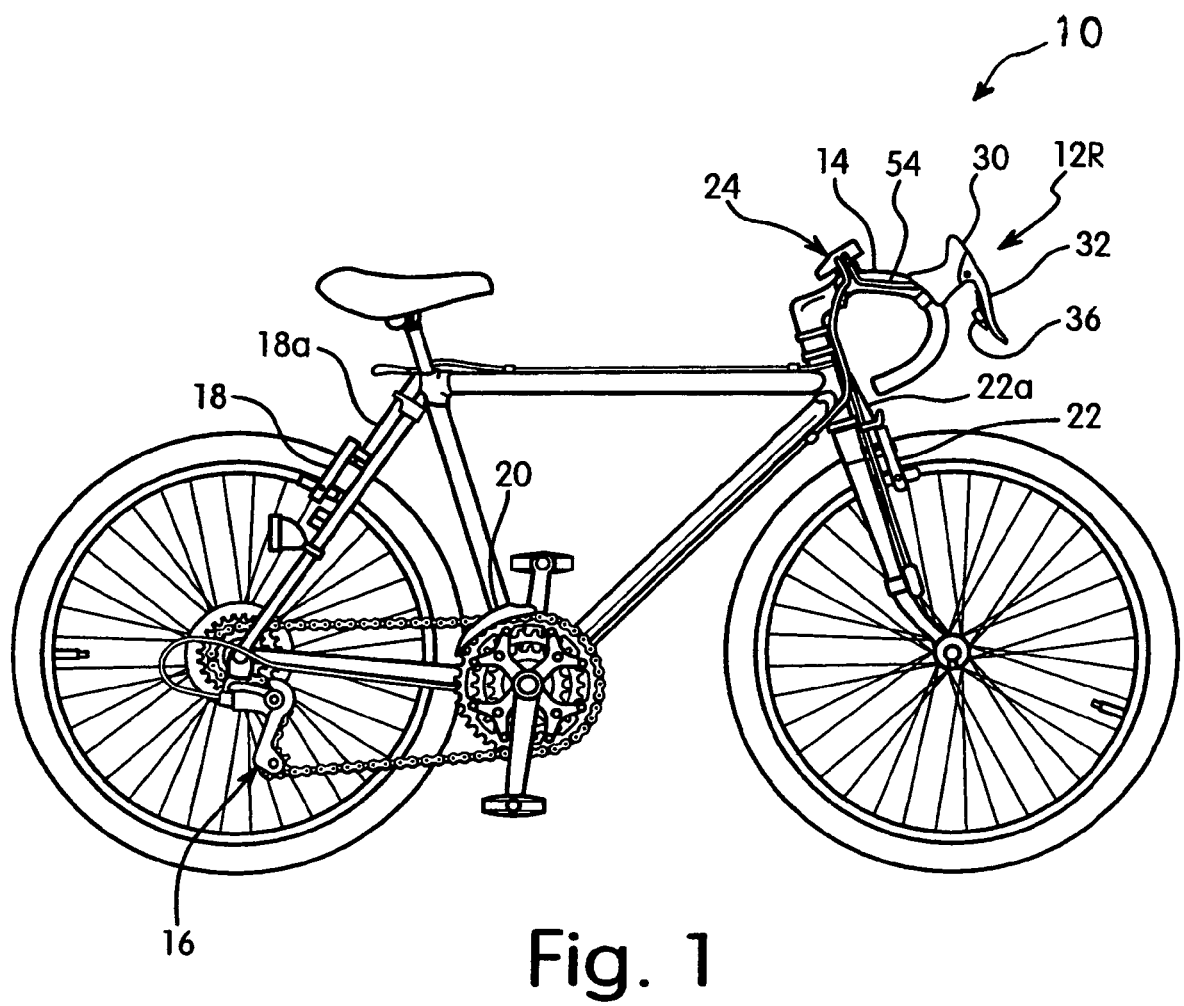
FIG. 1 is a side elevational view of a bicycle equipped with a pair of electrical shift and brake control devices (only one shown) in accordance with a first embodiment of the present invention.
Figure 2:
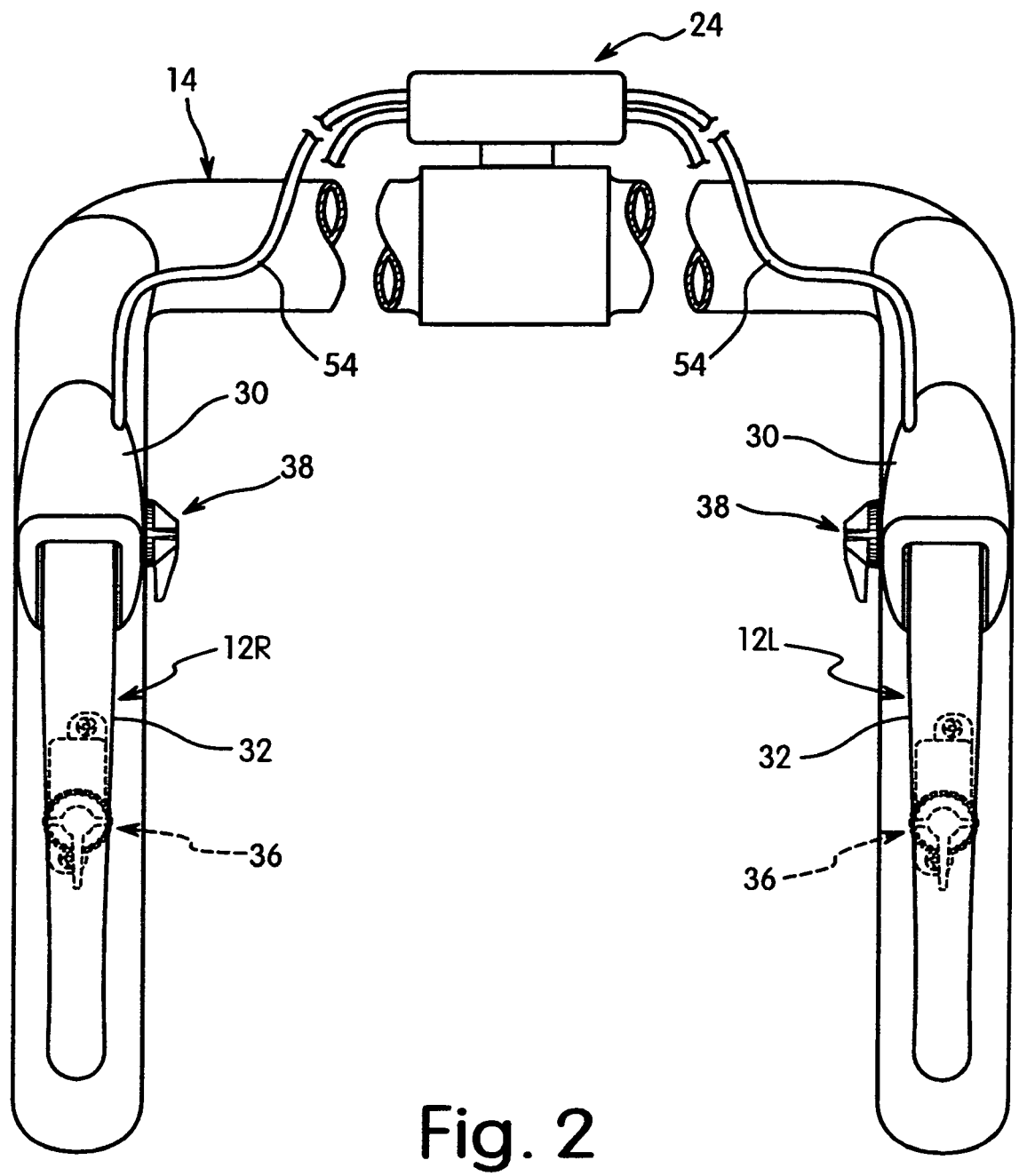
FIG. 2 is a partial enlarged front elevational view of the handlebar with the right and left electrical shift and brake control devices in accordance with the present invention.

Referring initially to FIGS. 1 and 2, a bicycle 10 is illustrated with a pair of electrical shift and brake control devices 12R and 12L (only one shown in FIG. 1) mounted on a bicycle handlebar 14 in accordance with a first embodiment of the present invention. The right and left hand side control devices 12R and 12L are essentially identical in construction and operation, except that that are mirror images. Thus, only one of the control devices 12R and 12L will be discussed and illustrated herein. Moreover, the parts of right and left hand side control devices 12R and 12L that are identical or mirror images will be given the same reference numerals for the sake of brevity.

The right hand side control device 12R is operatively coupled to a rear derailleur 16 via a cycle computer 24, while the left hand side control device 12L is operatively coupled to a front derailleur 20 via the cycle computer 24. Also, the right hand side control device 12R is directly coupled to a rear braking device 18 via a brake cable 18a, while the left hand side control device 12L is directly coupled to a front braking device 22 via a brake cable 22a.

Since these most of the parts of the bicycle 10 are well known in the art, most of the parts of the bicycle 10 will not be discussed or illustrated in detail herein, except for the parts relating to the control devices 12R and 12L of the present invention. Moreover, various conventional bicycle parts, which are not illustrated and/or discussed in detail herein, can also be used in conjunction with the present invention.

As best seen in FIG. 2, the electrical shift and brake control devices 12R and 12L forms a bicycle braking/shifting mechanism that is configured and arranged to be fixedly coupled to the bicycle handlebar 14. Basically, each of the electrical shift and brake control devices 12R and 12L comprises a support member or brake lever bracket 30, a brake lever 32, a brake lever biasing member 34, a first electrical shift control switch 36 and a second electrical shift control switch 38.

Figure 8:
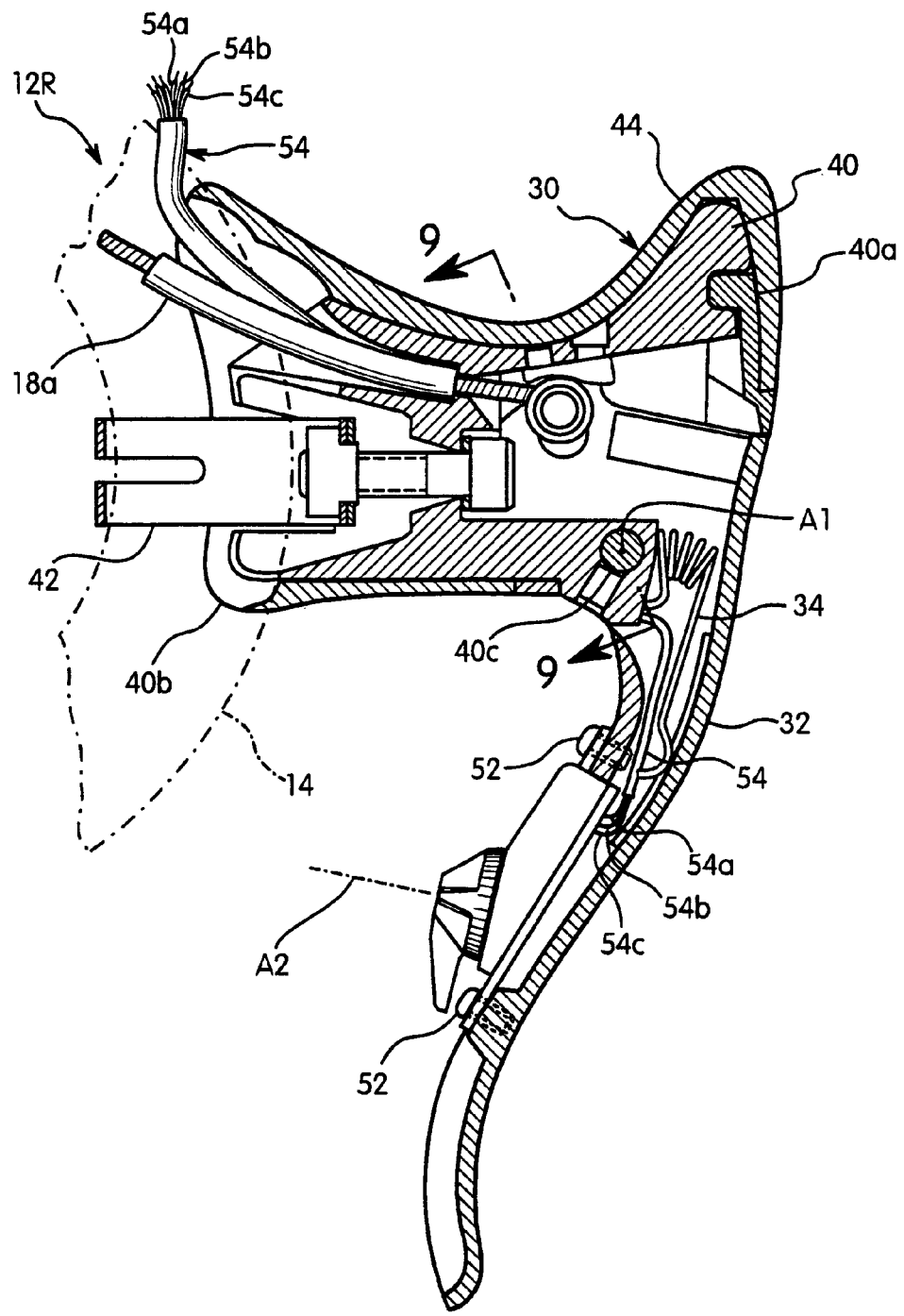
FIG. 8 is a cross sectional view of the right hand side control device illustrated in FIGS. 5–7 in accordance with the present invention as seen along section line 8—8 of FIG. 5.
Figure 9:
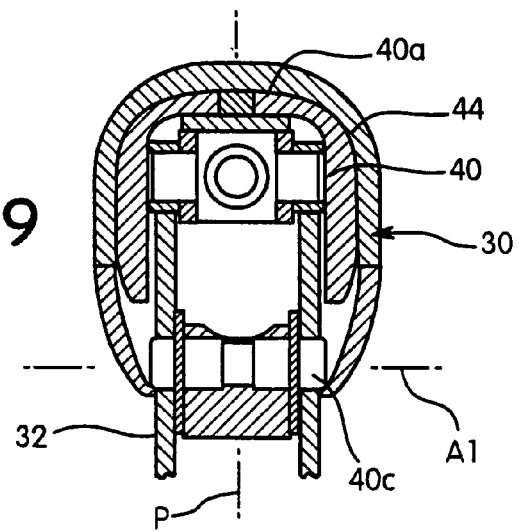
FIG. 9 is partial cross sectional view of the right hand side control device illustrated in FIGS. 5–8 as seen along section line 9—9 of FIG. 8.
Figure 10:
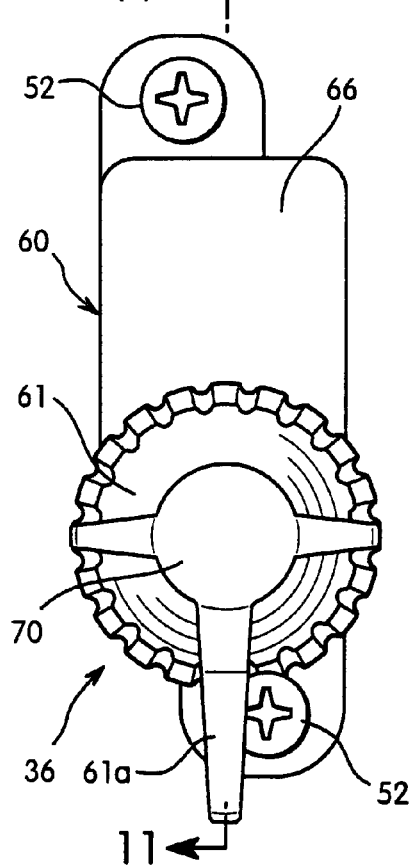
FIG. 10 is an elevational view of the first electrical shift control switch illustrated in FIGS. 3–8 for either the right or left hand side control device in accordance with the first embodiment of the present invention.

Referring to FIGS. 3–6, the brake lever bracket 30 has an inner side wall 30a, an outer side wall 30b, a front wall 30c and a bottom wall 30d. The brake lever bracket 30 basically comprises a rigid support or gripping body 40, a band or tube clamp 42 and an outer bracket cover 44 as best seen in FIG. 8. The gripping body 40 is configured and arranged to be fixedly coupled to the bicycle handlebar 14 by the band clamp 42 in a relatively conventional manner. Of course, it will be apparent to those skilled in the art from this disclosure that other mounting mechanisms can be used. The gripping body 40 is configured as a box-shaped bracket that facilitates gripping by the rider. The gripping body 40 includes a distal end portion 40a and a mounting end portion 40b. The mounting end 40b is configured and arranged to be coupled to the bicycle handlebar 14, while the distal end portion 40a is longitudinally spaced from the mounting end portion 40b. The mounting end portion 40b has the band clamp 42 secured to the bicycle handlebar 14. The distal end portion 40a of the gripping body 40 pivotally supports the brake lever 32 to the gripping body 40 by a pivot pin 40c about a rotationally operating axis or brake pivot axis A1. In the control device 12R, as seen in FIG. 8, the brake cable 18a is fixedly coupled to the brake lever 32 such that the inner wire is pulled when the rider squeezes the brake lever 32. Likewise, the brake cable 22a is fixedly coupled to the brake lever 32 of the control device 12L such that the inner wire is pulled when the rider squeezes the brake lever 32.

The outer bracket cover 44 is disposed over a majority of the exterior surface of the gripping body 40. The outer bracket cover 44 overlies most of the second electrical shift control switch 38. Preferably, the outer bracket cover 44 is constructed of a resilient synthetic material.

The brake lever biasing member 34 is preferably a spring that is mounted between the brake lever 32 and the gripping body 40 to urge the brake lever 32 from a braking position to a normal rest (non-braking) position. In particular, the brake lever 32 is basically pivoted about the brake pivot axis A1 by the rider pulling or squeezing the brake lever 32 toward the handlebar 14 along a brake operating plane P such that the inner wire of the brake cable 18a or 22a is pulled.

The first electrical shift control switch 36 is fixedly coupled to a lower intermediate portion of the brake lever 32 via a pair of screws 52. Thus, the first electrical shift control switch 36 moves with the brake lever 32 when the brake lever 32 is pivoted about the brake pivot axis A1 from the braking position to the rest position along the cable operating plane P. Preferably, the first electrical shift control switch 36 is mounted to the rearwardly spacing surface of the brake lever 32 such that the rider can operate the first electrical shift control switch 36 using a finger or a thumb. In the illustrated embodiment, the lateral width of the first electrical shift control switch 36 is less than or substantially equal to the width of the brake lever 32 such that the first electrical shift control switch 36 is not visible when viewed from the front of the bicycle 10. This arrangement protects the first electrical shift control switch 36 in the event that the bicycle 10 should fall over on its side.

Figure 3:
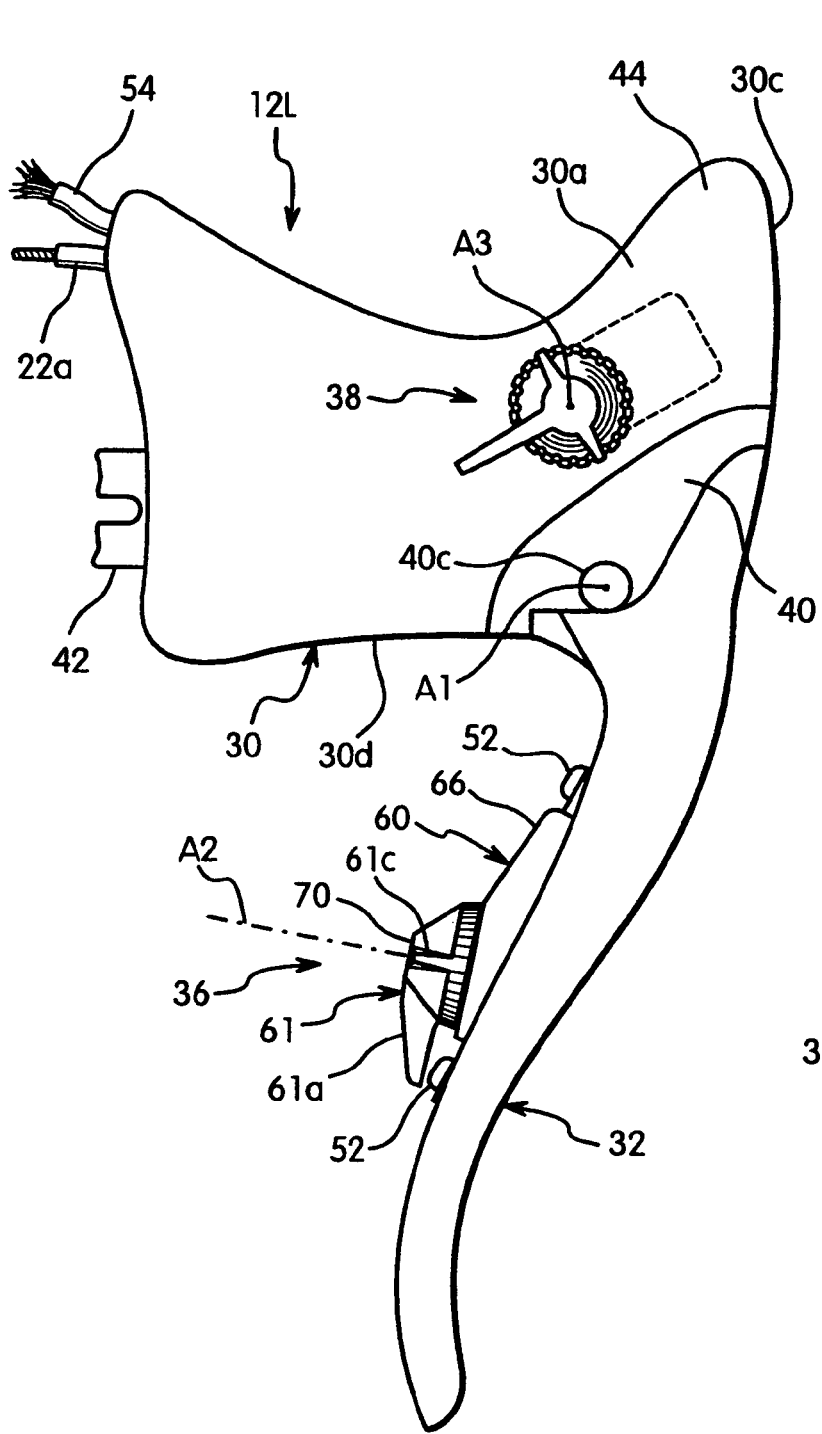
FIG. 3 is an enlarged inside elevational view of the left hand side control device illustrated in FIG. 2 in accordance with the present invention, with the brake lever in the normal rest (non-braking) position.
Figure 4:
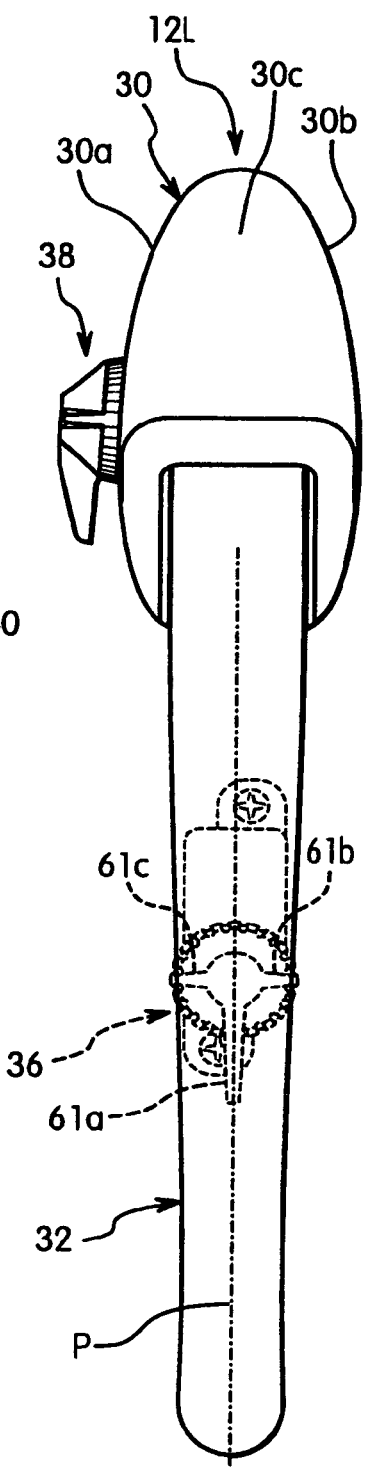
FIG. 4 is an enlarged front elevational view of the left hand side control device illustrated in FIG. 3 in accordance with the present invention, with the brake lever in the normal rest (non-braking) position.
Figures 5, 6:
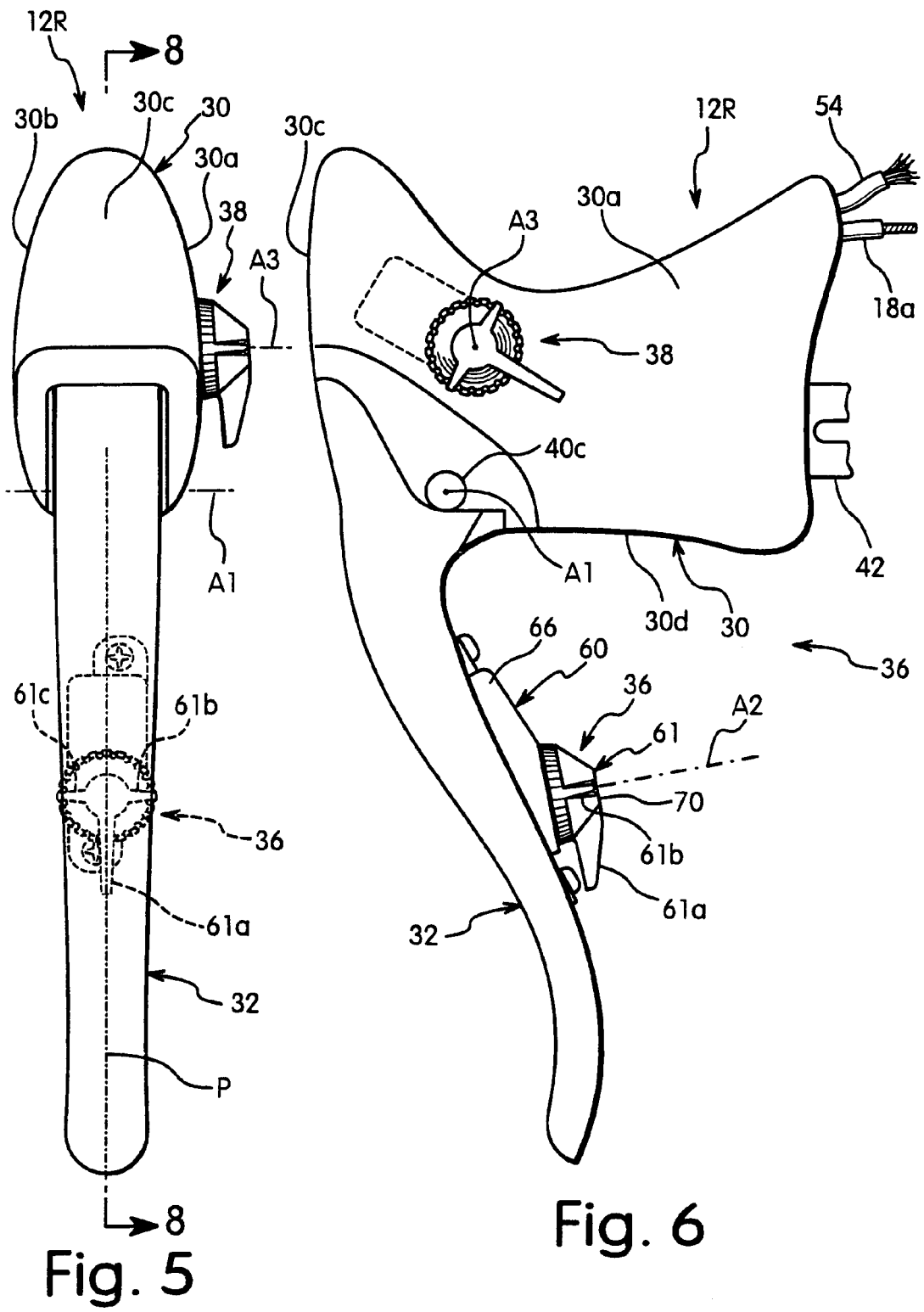
FIG. 5 is an enlarged front elevational view of the right hand side control device illustrated in FIGS. 1 and 2 in accordance with the present invention.
FIG. 6 is an enlarged side elevational view of the right hand side control device illustrated in FIG. 5 in accordance with the present invention, with the brake lever in the normal rest (non-braking) position.
Figure 7:
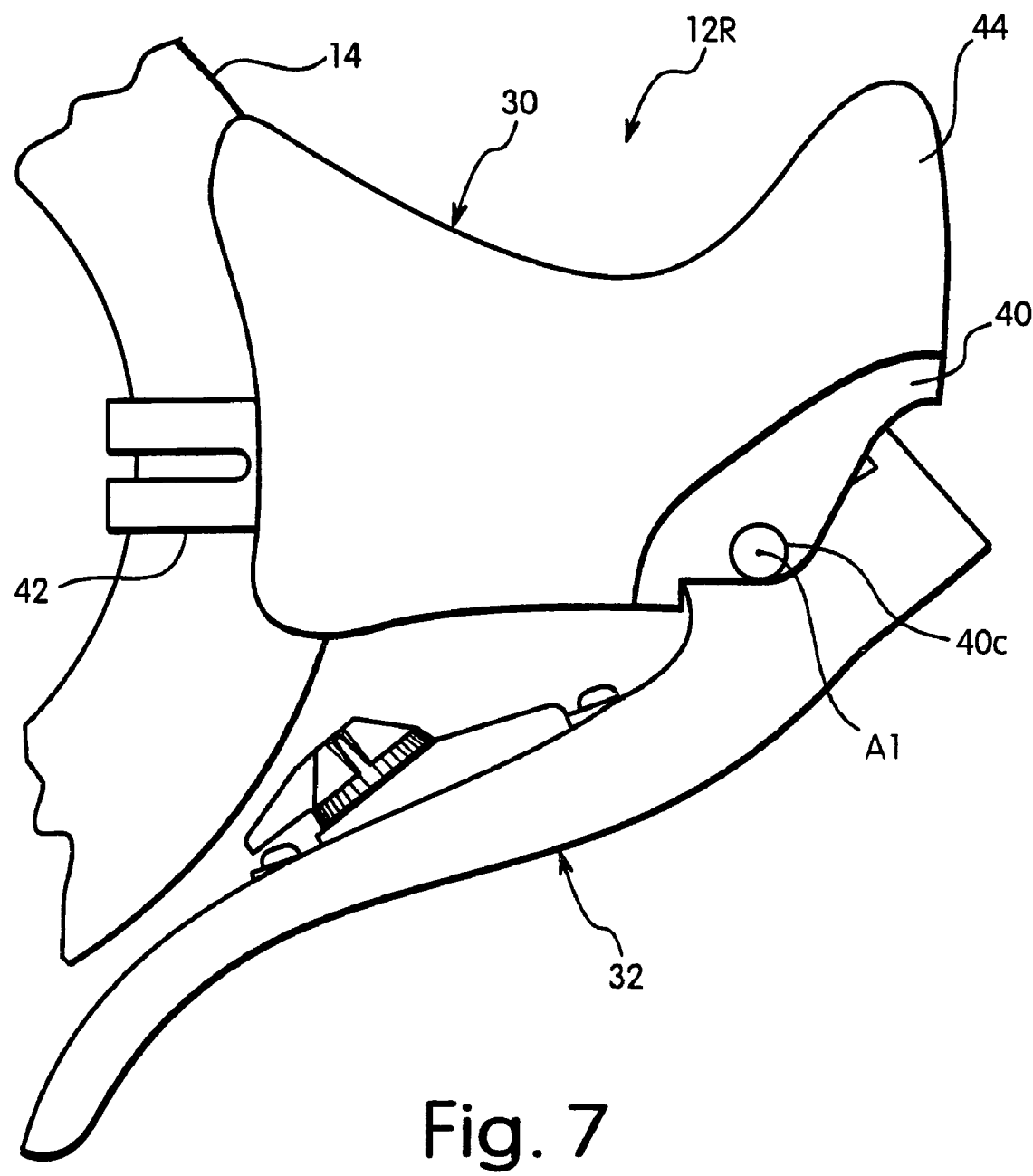
FIG. 7 is an enlarged side elevational view of the right hand side control device illustrated in FIGS. 5 and 6 in accordance with the present invention, with the brake lever in the braking position.

As best seen in FIGS. 2, 3 and 6, the second electrical shift control switch 38 is fixedly coupled to an inner side wall of the brake lever bracket 30. Preferably, a part of the gripping body 40 of the brake lever bracket 30 is integrally formed with the second electrical shift control switch 38. This arrangement protects the second electrical shift control switch 38 in the event that the bicycle 10 should fall over on its side.

As best seen in FIG. 2, the cycle computer 24 is electrically coupled to the first and second electrical shift control switches 36 and 38 of each of the control devices 12R and 12L via a pair of electrical cords 54. In particular, as seen in FIGS. 8, 12–14, each of the electrical cords 54 has a pair of first electrical conductors 54a, a pair of second electrical conductors 54b and a pair of third electrical conductors 54c, which are electrically coupled to the first and second electrical shift control switches 36 and 38. When one of the first conductors 54a is electrically connected to one of the second electrical conductors 54b via the first electrical shift control switch 36 or the second electrical shift control switch 38, then a downshift signal is transmitted to the cycle computer 24. On the other hand, when one of the first conductors 54a is electrically connected to one of the third electrical conductors 54c via the first electrical shift control switch 36 or the second electrical shift control switch 38, then an upshift signal is transmitted to the cycle computer 24.

Figure 11:
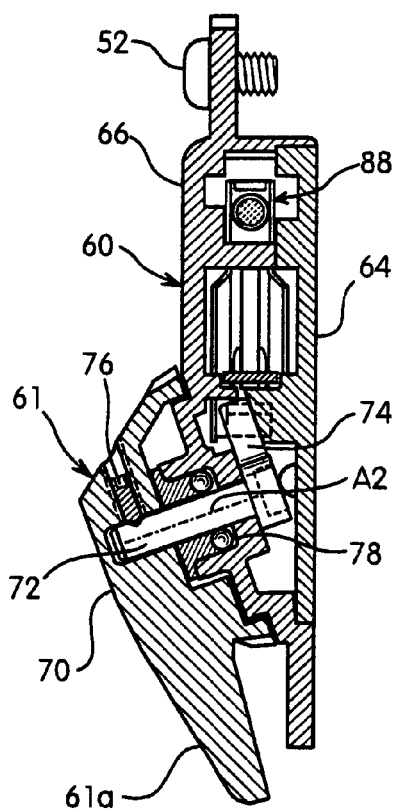
FIG. 11 is a longitudinal cross sectional view of the electrical shift control switch illustrated in FIG. 10 as seen along section line 11—11 of FIG. 10.

Basically, the first electrical shift control switch 36 includes a housing 60, an operating member 61 and an electrical contact assembly 62, as seen in FIG. 11. The operating member 61 is rotatably coupled to the housing 60 and operatively coupled to the electrical contact assembly 62. The electrical contact assembly 62 mounted within the housing 60 and configured and arranged to be operated by the operating member 61. As explained below in more detail, the first electrical shift control switch 36 has a first actuating or upshift position, a second actuating or downshift position and a neutral or rest position located between the first and second actuating positions. Accordingly, the first electrical shift control switch 36 can be utilized for both upshifting and downshifting of one of the derailleur 16 and 20 depending on which of the control devices that the electrical shift control switch 36 is mounted.

Preferably, the housing 60 is constructed of two pieces. For example, the housing 60 as illustrated, includes a base 64 and a cover 66 that is fixedly coupled to the base 64. The base 64 and cover 66 are preferably constructed of a hard rigid material such as a hard rigid plastic material. The electrical contact assembly 62 is housed within the housing 60 between the base 64 and the cover 66 and electrically coupled to the electrical conductors 54a–54c of the electrical cord 54.

The operating member 61 protrudes out from the cover 66 of the housing 60 such that rotational movement of the operating member 61 causes the electrical contact assembly 62 to move from a normal or rest position to one of the two actuating positions as explained below. The operating member 61 basically has a knob or dial (user engagement element) 70, a pivot shaft 72 and a toggle member 74. The knob 70 is fixedly attached the outer end of the pivot shaft 72 by a set pin 76 that contacts a flat portion of the outer end of the pivot shaft 72. The inner end of the pivot shaft 72 has the toggle member 74 fixedly coupled thereto. Thus, rotation of the knob 70 by the rider causes the pivot shaft 72 and the toggle member 74 to rotate therewith.

Preferably, a bearing assembly 78 is positioned between the cover 66 and the pivot shaft 72 such that the operating member 61 pivots or rotates smoothly about a rotationally operating axis or pivot axis A2. Preferably, the pivot axis A2 of the operating member 61 lies in the brake lever operating plane P of the brake lever 32. Thus, the pivot axis A2 of the operating member 61 is substantially perpendicular or orthogonally arranged relative to the brake pivot axis A1. The operating member 61 includes a first or primary actuating member or protrusion 61a arranged at a first angular location relative to the pivot axis A2, and a pair of secondary actuating members or protrusions 61b and 61c arranged at second and third angular locations relative to the pivot axis A2 that are space from the first angular location of the first actuating member 61a.

Figure 12:
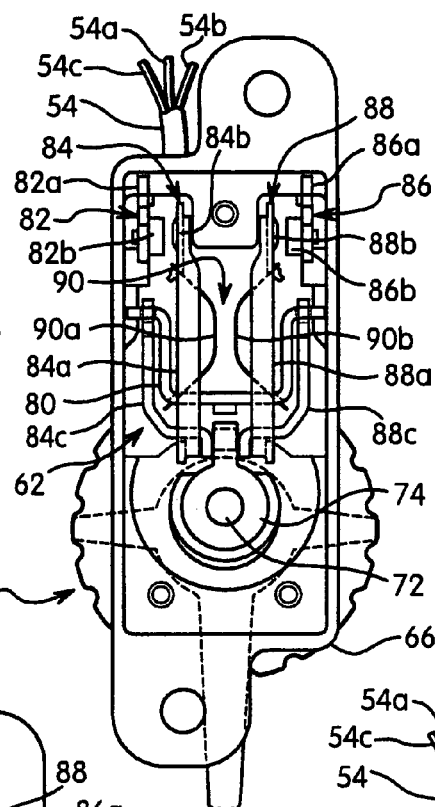
FIG. 12 is an elevational view of the electrical shift control switch illustrated in FIGS. 10 and 11 with the base removed to shown the electrical shift control switch in the neutral position, i.e., the movable contacts spaced from the stationary contacts so that no electrical connection is made between the contacts.
Figure 13:
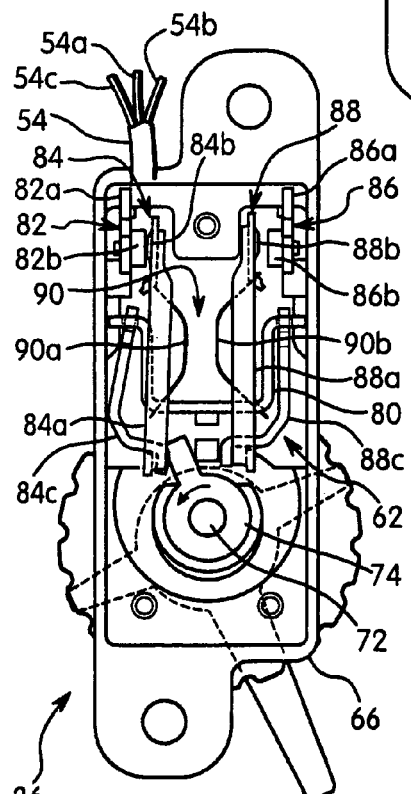
FIG. 13 is an elevational view of the electrical shift control switch illustrated in FIGS. 10–12 with the base removed to shown the electrical shift control switch in the upshift position, i.e., one of the movable contacts one of the stationary contacts so that an electrical connection is established between the contacts.
Figure 14:
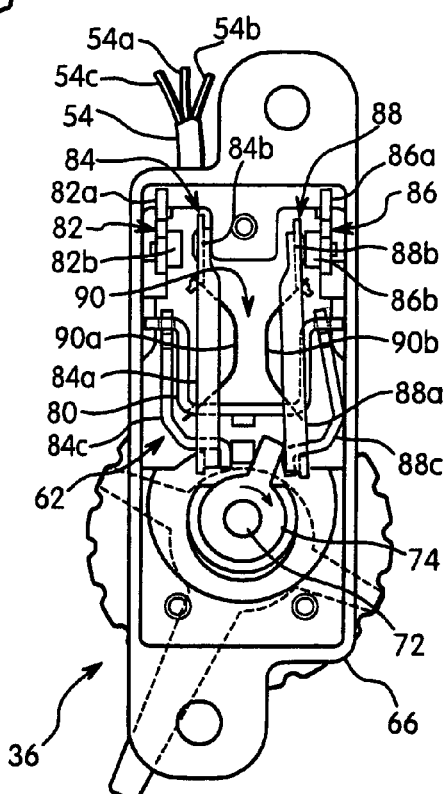
FIG. 14 is an elevational view of the electrical shift control switch illustrated in FIGS. 10–13 with the base removed to shown the electrical shift control switch in the downshift position, i.e., one of the movable contacts one of the stationary contacts so that an electrical connection is established between the contacts.
Figure 15:
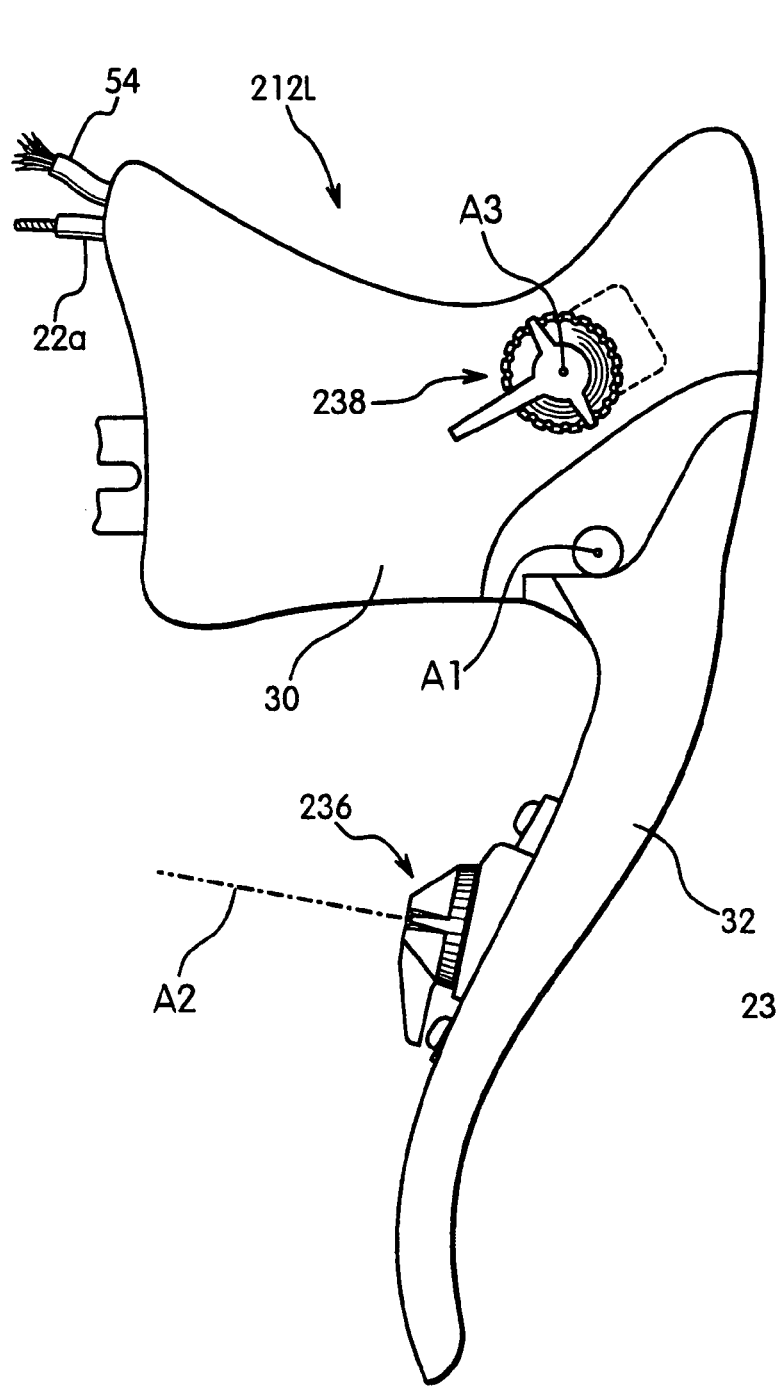
FIG. 15 is an enlarged inside elevational view of a left hand side control device illustrated in accordance with a second embodiment of the present invention, with the brake lever in the normal rest (non-braking) position.
Figure 16:
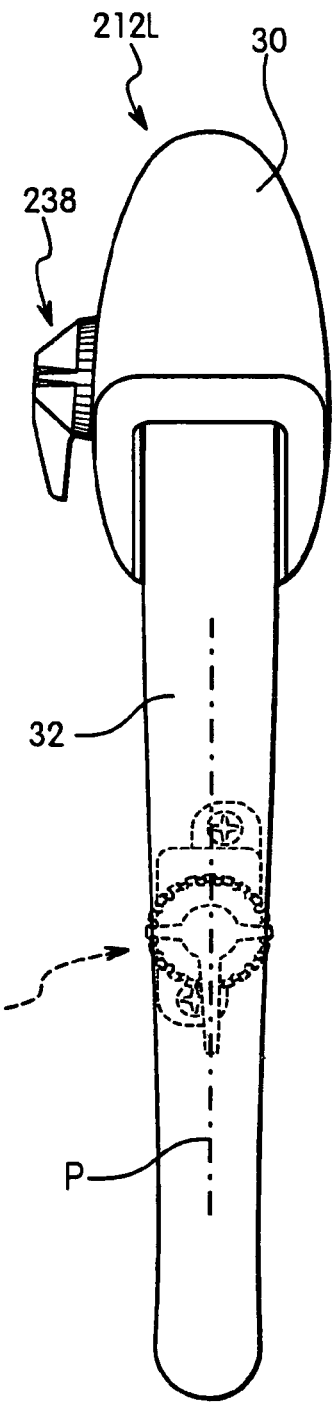
FIG. 16 is an enlarged front elevational view of the left hand side control device illustrated in FIG. 15 in accordance with the second embodiment of the present invention, with the brake lever in the normal rest (non-braking) position.
Figure 22:
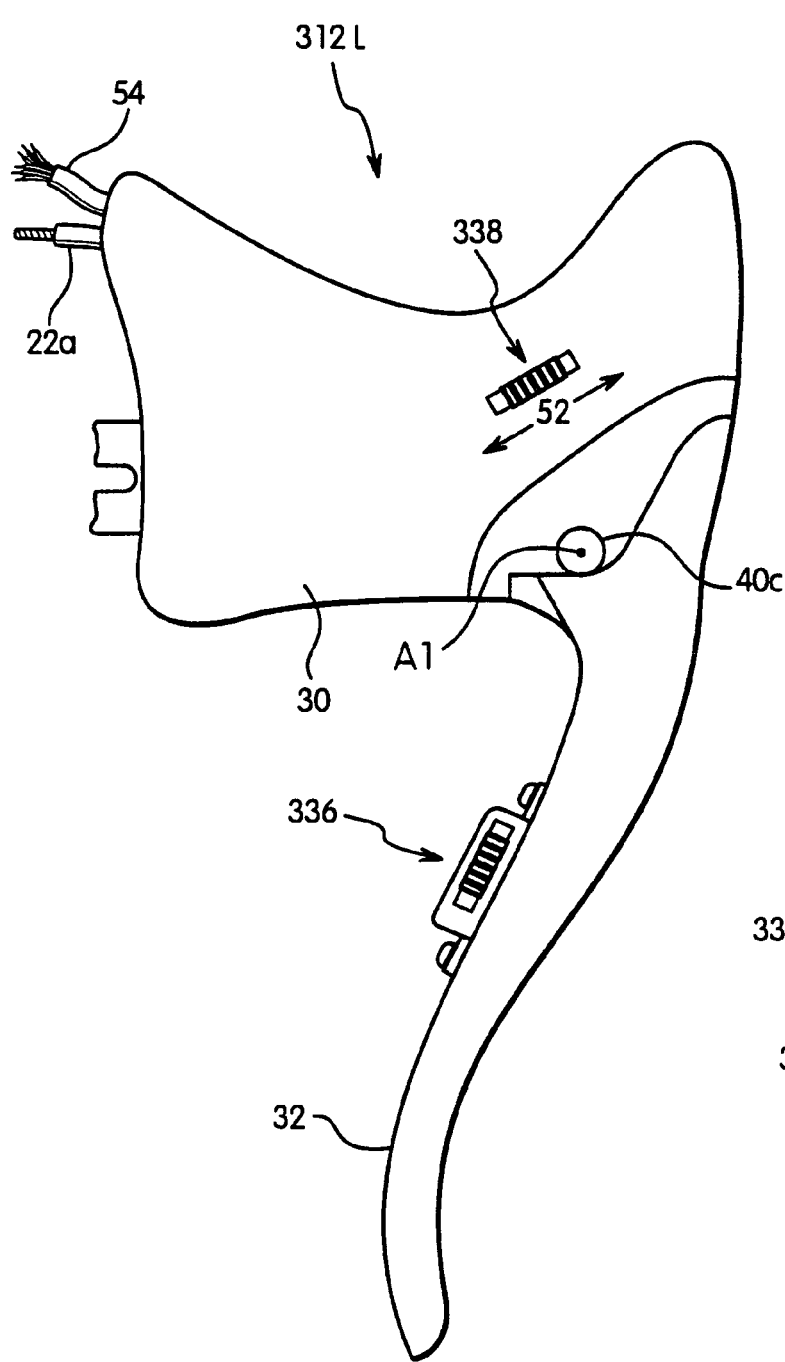
FIG. 22 is an enlarged inside elevational view of a left hand side control device illustrated in accordance with a third embodiment of the present invention, with the brake lever in the normal rest (non-braking) position.

As seen in FIG. 12–14, the electrical contact assembly 62 preferably includes a common contact bar 80, a first stationary contact 82, a first movable (upshift) contact 84, a second stationary contact 86, a second movable (downshift) contact 88 and a biasing element 90 formed of a pair of leaf springs 90a and 90b. Generally, when the first electrical shift control switch 36 is in a rest position, the toggle member 74 of the operating member 61 is located centrally between the first and second movable contacts 84 and 88. In particular, the biasing element 90 holds the toggle member 74 of the operating member 61 in a rest position between the first and second movable contacts 84 and 88. However, when the rider rotates the knob 70 of the operating member 61, this causes the pivot shaft 72 to pivot the toggle member 74 against one of the movable contacts 84 and 88. This pivotal movement of the toggle member 74 causes one of the movable contacts 82 and 88 to be deflected such that the deflected movable contact directly contacts the corresponding one of the stationary contacts 82 and 86. More specifically, when the knob 70 of the operating member 61 is rotated in a clockwise direction (counterclockwise direction as viewed from the bottom of the switch 36 in FIGS. 12–14), the toggle member 74 deflects the first movable contact 84 such that the first movable contact 84 contacts the first stationary contact 82. Thus, an electrical connection is made between the first stationary contact 82 and the first movable contact 84 such that an upshift control signal is sent to the cycle computer 24, which in turn operates one of the derailleurs 16 and 20 to cause an upshift to occur. If the knob 70 of the operating member 61 is rotated in a counterclockwise direction (clockwise direction as viewed from the bottom of the switch 36 in FIGS. 12–14), a downshift of one of the derailleurs 16 and 20 occurs. In particular, rotation of the knob 70 of the operating member 61 causes the toggle member 74 to deflect the second movable contact 88 against the second stationary contact 86 to result in an electrical connection therebetween. This electrical connection causes a control signal to be inputted into the cycle computer 24 such that a downshift control signal is sent to one of the derailleurs 16 and 20.

The cycle computer 24 is electrical coupled to the first electrical shift control switch 36 via the electrical cord 54. In particular, the first electrical conductor 54a of the electrical cord 54 is electrically connected to the common contact bar 80. The second electrical conductor 54b of the electrical cord 54 is electrically connected to the first stationary contact 82, while the third electrical conductor 54c of the electrical cord 54 is electrically connected the second stationary contact 86. When the first contacts 82 and 84 are touching, the first conductor 54a is electrically connected to the second electrical conductor 54b to transmit an upshift control signal to the cycle computer 24. On the other hand, when the second contacts 86 and 88 are touching, the first conductor 54a is electrically connected to the third electrical conductor 54c to transmit a downshift control signal to the cycle computer 24.

Basically, the first stationary contact 82 includes a wiring plate 82a and a contact element 82b with a first stationary engagement surface. The first stationary contact 82 is constructed of a rigid electrical conductive material such as those known in the art. The first stationary contact 82 is fixedly secured to the housing 60 when the base 64 and the cover 66 are fixedly coupled together. The second electrical conductor 54b of the electrical cord 54 is electrically connected to the first stationary contact 82 by soldering or otherwise attaching the conductor to the wiring plate 82a.

The first movable contact 84 includes a first mounting element 84a with a contact element 84b mounted on one end of the first mounting element 84a, and a second mounting element 84c coupled to the other end of the first mounting element 84a. The elements 84a–84c of the first movable contact 84 are constructed of rigid electrical conductive materials such that an electrical path is created by these elements. The first mounting element 84a is swingably mounted to the common contact bar 80 and the second mounting element 84c such that the first mounting element 84a moves between a normal or rest position and an actuating position in response to the clockwise rotation of the knob 70 of the operating member 61. Thus, the contact element 84b has a movable engagement surface that is arranged and configured to move with the first mounting element 84a when the operating member 61 is operated. In other words, the movable engagement surface of the contact element 84b of the first movable contact 84 selectively moves into electrical engagement with the first stationary engagement surface of the contact element 82b of the first stationary contact 82 upon clockwise rotation of the knob 70 of the operating member 61 to the first actuating or upshift position.

The second mounting element 84c is coupled between the common contact bar 80 and the free end of the first mounting element 84a to control the swinging or pivotal movement of the first mounting element 84a. Thus, the second mounting element 84c is pivotally mounted at its first end to the common contact bar 80 and at its second end to the first mounting element 84a. The leaf spring 90a of the biasing element 90 is coupled between the common contact bar 80 on the first mounting element 84a such that the first and second mounting elements 84a and 84c urges the toggle member 74 of the operating member 61 to the center rest position and the contact element 84b out of engagement with the stationary contact element 82b.

This arrangement of the leaf spring 90a together with the first and second mounting elements 84a and 84c form parts of an audible clicking structure that is configured and arranged to produce an audible sound that occurs upon selective movement of the operating member 61 to the first actuating position. In other words, an audible clicking sound occurs simultaneous with the movable engagement surface of the contact element 84b engaging the stationary engagement surface of the contact element 82b.

Basically, the second stationary contact 86 includes a wiring plate 86a and a contact element 86b with a second stationary engagement surface. The second stationary contact 86 is constructed of a rigid electrical conductive material such as those known in the art. The second stationary contact 86 is fixedly secured to the housing 60 when the base 64 and the cover 66 are fixedly coupled together. The third electrical conductor 54c of the electrical cord 54 is electrically connected to the second stationary contact 86 by soldering or otherwise attaching the conductor to the wiring plate 86a.

The second movable contact 88 includes a first mounting element 88a with a contact element 88b mounted on one end of the first mounting element 88a, and a second mounting element 88c coupled to the other end of the first mounting element 88a. The elements 88a–88c of the second movable contact 88 are constructed of rigid electrical conductive materials such that an electrical path is created by these elements. The second mounting element 88a is swingably mounted to the common contact bar 80 and the second mounting element 88c such that the second mounting element 88a moves between a normal or rest position and an actuating position in response to the counterclockwise rotation of the knob 70 of the operating member 61. Thus, the second contact element 88b has a movable engagement surface that is arranged and configured to move with the first mounting element 88a when the operating member 61 is operated. In other words, the movable engagement surface of the contact element 88b of the second movable contact 88 selectively moves into electrical engagement with the second stationary engagement surface of the contact element 86b of the second stationary contact 86 upon counterclockwise rotation of the knob 70 of the operating member 61 to the second actuating or downshift position.

The second mounting element 88c is coupled between the common contact bar 80 and the free end of the first mounting element 88a to control the swinging or pivotal movement of the first mounting element 88a. Thus, the second mounting element 88c is pivotally mounted at its first end to the common contact bar 80 and at its second end to the first mounting element 88a. The leaf spring 90b of the biasing element 90 is coupled between the common contact bar 80 on the first mounting element 88a such that the first and second mounting elements 88a and 88c are biased to move the toggle member 74 of the operating member 61 to the center rest position and the contact element 88b out of engagement with the stationary contact element 86b.

This arrangement of the leaf spring 90b together with the first and second mounting elements 88a and 88c form additional parts of the audible clicking structure that is further configured and arranged to produce an audible sound that occurs upon selective movement of the operating member 61 to the second actuating position. In other words, an audible clicking sound occurs simultaneously with the movable engagement surface of the contact element 88b engaging the stationary engagement surface of the contact element 86b.

The second electrical shift control switch 38 is fixedly coupled to the inner side wall of the brake lever bracket 30. The second electrical shift control switch 38 is either identical to the first electrical shift control switch 36 or the housing of the second electrical shift control switch 38 is modified to provided a more integrated housing control switch. Preferably, the gripping body 40 of the brake lever bracket 30 forms a part of the housing of the second electrical shift control switch 38. Thus, other than the possible modification to the housing of the second electrical shift control switch 38, the first and second electrical shift control switches 36 and 38 operate in an identical manner. Of course, the second electrical shift control switch 38 has its rotationally operating axis or pivot axis A3 oriented to be substantially parallel the rotationally operating axis or brake pivot axis A1 of the brake lever 32.

Second Embodiment

Referring now to FIGS. 15–21, a left hand side electrical shift and brake control devices 212L will now be explained that is mounted to the bicycle handlebar 14 in accordance with a second embodiment of the present invention. The right hand side control device is essentially identical in construction and operation to the left hand side electrical shift and brake control device 212L, except that they are mirror images. Thus, only the control device 212L will be discussed and illustrated herein.

Basically, the electrical shift and brake control device 212L is identical to the electrical shift and brake control device 12L of the first embodiment, except that that the electrical shift control switches 36 and 38 of the first embodiment have been replaced with a pair of electrical shift control switches 236 and 238 in accordance with the second embodiment. Accordingly, some of the parts of the second embodiment that are identical or substantially identical will be given the same reference numerals as those used to explain the first embodiment for the sake of brevity.

Thus, the electrical shift control switches 236 and 238 in accordance with the second embodiment will now be explained as being installed on the brake lever 32 and the brake lever bracket 30, respectively. In view of the similarity between the first and second embodiments, the descriptions of the parts of the second embodiment that are identical to the parts of the first embodiment may be omitted for the sake of brevity.

Basically, the electrical shift control switch 236 includes a housing 260, an operating member 261 and an electrical contact assembly 262. The operating member 261 is rotatably coupled to the housing 260 and operatively coupled to the electrical contact assembly 262. The electrical contact assembly 262 mounted between the housing 260 and the operating member 261. The electrical contact assembly 262 is configured and arranged to be operated by the operating member 261. As explained below in more detail, the electrical shift control switch 236 has a first actuating or upshift position, a second actuating or downshift position and a neutral or rest position located between the first and second actuating positions. Accordingly, the electrical shift control switch 236 can be utilized for both upshifting and downshifting the derailleur 20. Of course, the electrical shift control switch 236 can be utilized for both upshifting and downshifting the derailleur 16 when the electrical shift control switch 236 is mounted on the right hand side control device.

Preferably, the housing 260 is constructed of two pieces. For example, the housing 260 as illustrated, includes a base 264 and a cover 266 that is fixedly coupled to the base 264. The base 264 and cover 266 are preferably constructed of a hard rigid material such as a hard rigid plastic material. The electrical contact assembly 262 is housed within the housing 260 between the base 264 and the cover 266. The electrical contact assembly 262 is electrically coupled to one set of the electrical conductors 54a–54c of the electrical cord 54.

The operating member 261 protrudes out from the cover 266 of the housing 260 such that rotational movement of the operating member 261 causes the electrical contact assembly 262 to move from a normal or rest position to one of the two actuating positions as explained below. The operating member 261 basically has a knob or dial 270 that is fixedly attached an outer end of a pivot shaft 272 by a set pin 276 that contacts a flat portion of the outer end of the pivot shaft 272. The inner end of the pivot shaft 272 is secured to the cover 266, and is operatively coupled to the electrical contact assembly 262. Thus, rotation of the knob 270 by the rider causes the pivot shaft 272 to rotate therewith. Preferably, a bearing assembly 278 is positioned between the cover 266 and the pivot shaft 272 such that the operating member 261 pivots or rotates smoothly about the pivot axis A2. Preferably, the pivot axis A2 of the operating member 261 lies in the brake lever operating plane P of the brake lever 32. Thus, the pivot axis A2 of the operating member 261 is substantially perpendicular or orthogonally arranged relative to the brake pivot axis A1.

The electrical contact assembly 262 preferably includes a common stationary contact 280, a first stationary (upshift) contact 282, a second stationary (downshift) contact 286, a movable contact 288 and a biasing element 290 formed of a torsion spring mounted on the pivot shaft 272. In this embodiment, the common stationary contact 280, the first stationary contact 282 and the second stationary (downshift) contact 286 are fixed to the cover 266 and arranged about the pivot shaft 272. The movable contact 288, on the other hand, is fixed to the pivot shaft 272 to rotate or pivot therewith. Generally, when the first electrical shift control switch 236 is in a rest position, the movable contact 288 is located centrally between the first and second stationary contacts 282 and 286. In particular, the biasing element 290 holds the operating member 261 and the movable contact 288 in a rest position between the first and second stationary contacts 282 and 286. However, when the rider rotates the knob 270 of the operating member 261, this causes the pivot shaft 272 to pivot the movable contact 288 to slide into electrical engagement with one of the stationary contacts 282 and 286. This movement of the movable contact 288 causes any oxidation or other contaminants to be wiped off of the contact or engagement surfaces of the stationary contacts 282 and 286 and the movable contact 288. More specifically, when the knob 270 of the operating member 261 is rotated in a clockwise direction, the movable contact 288 slides into contact with the first stationary contact 282. Thus, an electrical connection is made between the first stationary contact 282 and the movable contact 288 such that an upshift control signal is sent to the cycle computer 24, which in turn operates the derailleur 20 to cause an upshift to occur. If the knob 270 of the operating member 261 is rotated in a counterclockwise direction, a downshift of the derailleur 20 occurs. In particular, rotation of the knob 270 of the operating member 261 causes the movable contact 288 slides into contact with the second stationary contact 286 to result in an electrical connection therebetween. This electrical connection causes a control signal to be inputted into the cycle computer 24 such that a downshift control signal is sent to the derailleur 20. The cover 266 has an abutment 267 that selectively contacts one of two abutments 273 and 275 that are formed on the knob 270 to limit rotation of the knob 270.

Of course, the electrical shift control switch 236 can be utilized for both upshifting and downshifting the derailleur 16 when the electrical shift control switch 236 is mounted on the right hand side control device.

The cycle computer 24 is electrical coupled to the electrical shift control switch 236 via the electrical cord 54 in the same manner as the first embodiment. In particular, the first electrical conductor 54a of the electrical cord 54 is electrically connected to the common stationary contact 280 and the movable contact 288. The second electrical conductor 54b of the electrical cord 54 is electrically connected to the first stationary (upshift) contact 282, while the third electrical conductor 54c of the electrical cord 54 is electrically connected the second stationary (downshift) contact 286. When the movable contact 288 is touching the common stationary contact 280 and the first stationary (upshift) contact 282, the first conductor 54a is electrically connected to the second electrical conductor 54b to transmit an upshift control signal to the cycle computer 24. On the other hand, when the movable contact 288 is touching the common stationary contact 280 and the second stationary (downshift) contact 286, the first conductor 54a is electrically connected to the third electrical conductor 54c to transmit a downshift control signal to the cycle computer 24.

Basically, the common stationary contact 280 is a ring shaped contact element with a stationary engagement surface that is always touching the movable contact 288. The common stationary contact 280 is constructed of a rigid electrical conductive material such as those known in the art. The common stationary contact 280 is fixedly secured to the cover 266 of the housing 260. The first electrical conductor 54a of the electrical cord 54 is electrically connected to the common stationary contact 280 by soldering or otherwise attaching the conductor thereto.

Basically, the first stationary contact 282 is an arc shaped contact element with a first stationary engagement surface. The first stationary contact 282 is constructed of a rigid electrical conductive material such as those known in the art. The first stationary contact 282 is fixedly secured to the cover 266 of the housing 260. The second electrical conductor 54b of the electrical cord 54 is electrically connected to the first stationary contact 282 by soldering or otherwise attaching the conductor thereto.

Basically, the second stationary contact 286 is an arc shaped contact element with a second stationary engagement surface. The second stationary contact 286 is constructed of a rigid electrical conductive material such as those known in the art. The second stationary contact 286 is fixedly secured to the cover 266 of the housing 260. The third electrical conductor 54c of the electrical cord 54 is electrically connected to the second stationary contact 286 by soldering or otherwise attaching the conductor thereto.

The movable contact 288 moves with the pivot shaft 272 to slide into electrical engagement with one of the stationary contacts 282 and 286. Thus, the movable contact 288 is configured and arranged to selectively connect the common stationary contact 280 to the stationary contacts 282 and 286 using a sliding electrical contact arrangement. This sliding movement of the movable contact 288 causes any oxidation or other contaminants to be wiped off of the contact or engagement surfaces of the contacts 280, 282, 286 and 288.

The movable contact 288 is maintained in the neutral position by the biasing element 290. Thus, movable contact 288 moves between a normal or rest position and a first actuating position in response to the clockwise rotation of the knob 270 of the operating member 261. Thus, the movable contact 288 has a movable engagement surface that is arranged and configured to move with the pivot shaft 272 when the operating member 261 is operated. In other words, the movable engagement surface of the movable contact 288 selectively moves into electrical engagement with the first stationary engagement surface of the first stationary contact 282 upon clockwise rotation of the knob 270 of the operating member 261 to the first actuating or upshift position.

Likewise, the movable engagement surface of the movable contact 288 selectively moves into electrical engagement with the second stationary engagement surface of the second stationary contact 286 upon counterclockwise rotation of the knob 270 of the operating member 261 to the second actuating or downshift position.

The second electrical shift control switch 238 is fixedly coupled to the inner side wall of the brake lever bracket 30. The second electrical shift control switch 238 is either identical to the first electrical shift control switch 236 or the housing of the second electrical shift control switch 238 is modified to provided a more integrated housing control switch. Preferably, the gripping body 40 of the brake lever bracket 30 forms a part of the housing of the second electrical shift control switch 238. Thus, other than the possible modification to the housing of the second electrical shift control switch 238, the first and second electrical shift control switches 236 and 238 operate in an identical manner. Of course, the second electrical shift control switch 238 has its rotationally operating axis or pivot axis A3 oriented to be substantially parallel the rotationally operating axis or brake pivot axis A1 of the brake lever 32.

Third Embodiment

Referring now to FIGS. 22–28, a left hand side electrical shift and brake control devices 312L will now be explained that is mounted to the bicycle handlebar 14 in accordance with a third embodiment. The right hand side control device is essentially identical in construction and operation to the left hand side electrical shift and brake control device 312L, except that they are mirror images. Thus, only the control device 312L will be discussed and illustrated herein.

Basically, the electrical shift and brake control device 312L is identical to the electrical shift and brake control device 12L of the first embodiment, except that the electrical shift control switches 36 and 38 of the first embodiment have been replaced with a pair of electrical shift control switches 336 and 338 in accordance with the second embodiment. In particular, the electrical shift control switches 336 and 338 are identical to the electrical shift control switches 336 and 338, except the electrical shift control switches 336 and 338 uses a linear sliding switch instead of a rotary switch. Accordingly, some of the parts of the third embodiment that are identical or substantially identical will be given the same reference numerals as those used to explain the first embodiment for the sake of brevity.

Thus, the electrical shift control switches 336 and 338 in accordance with the second embodiment will now be explained as being installed on the brake lever 32 and the brake lever bracket 30, respectively. In view of the similarity between the first and third embodiments, the descriptions of the parts of the third embodiment that are identical to the parts of the first embodiment may be omitted for the sake of brevity.

Basically, the first electrical shift control switch 336 includes a housing 360, an operating member 361 and an electrical contact assembly 362 that is identical to the electrical contact assembly 62 discussed above. The operating member 361 is slideably coupled to the housing 360 and operatively coupled to the electrical contact assembly 362. The electrical contact assembly 362 mounted within the housing 360 and configured and arranged to be operated by the operating member 361. As explained below in more detail, the electrical shift control switch 336 has a first actuating or upshift position, a second actuating or downshift position and a neutral or rest position located between the first and second actuating positions. Accordingly, the electrical shift control switch 336 can be utilized for both upshifting and downshifting of the derailleur 20. Of course, the electrical shift control switch 336 can be utilized for both upshifting and downshifting the derailleur 16 when the electrical shift control switch 336 is mounted on the right hand side control device.

Preferably, the housing 360 is constructed of two pieces. For example, the housing 360 as illustrated, includes a base 364 and a cover 366 that is fixedly coupled to the base 364. The base 364 and cover 366 are preferably constructed of a hard rigid material such as a hard rigid plastic material. The electrical contact assembly 362 is housed within the housing 360 between the base 364 and the cover 366 and electrically coupled to the electrical conductors 54a–54c of the electrical cord 54.

Figure 23:
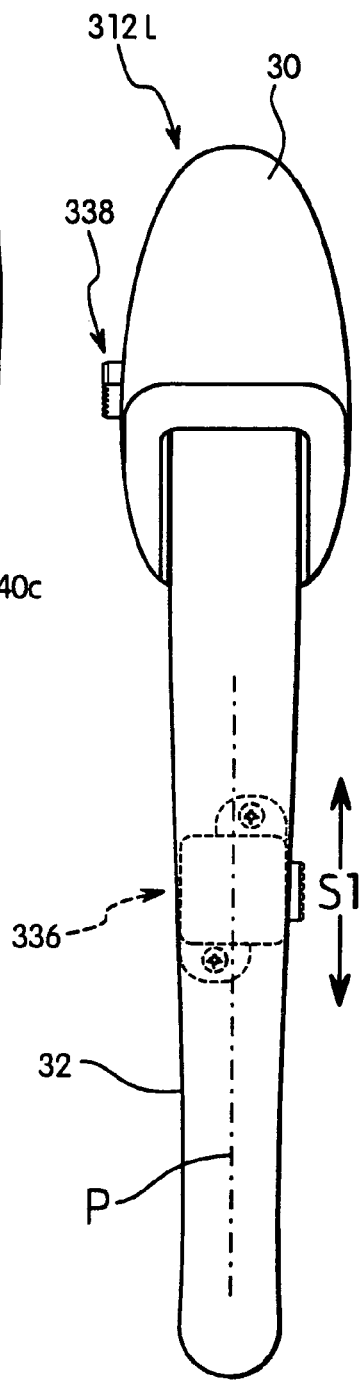
FIG. 23 is an enlarged front elevational view of the left hand side control device illustrated in FIG. 22 in accordance with the third embodiment of the present invention, with the brake lever in the normal rest (non-braking) position.
Figure 24:
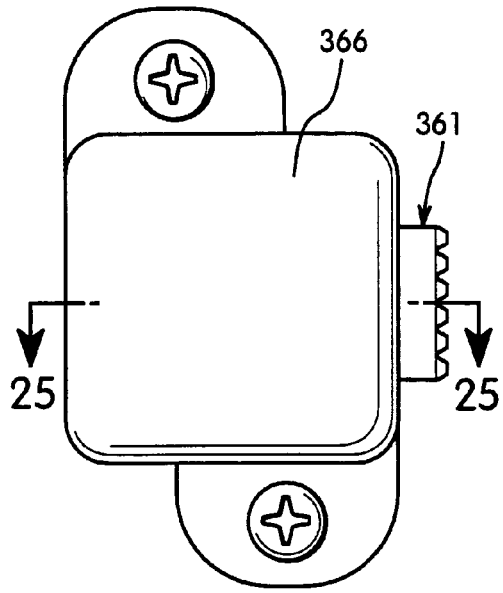
FIG. 24 is an elevational view of the electrical shift control switch in accordance with the third embodiment of the present invention.
Figure 25:
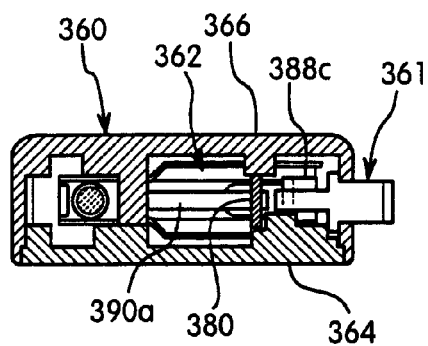
FIG. 25 is a longitudinal cross sectional view of the electrical shift control switch illustrated in FIG. 24 as seen along section line 25—25 of FIG. 24.
Figure 26:
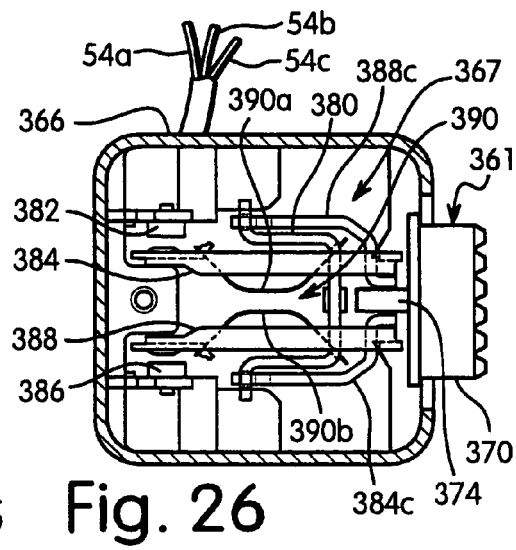
FIG. 26 is an elevational view of the electrical shift control switch illustrated in FIGS. 24 and 25 with the knob removed to shown the electrical shift control switch in the neutral position, i.e., the movable contacts spaced from the stationary contacts so that no electrical connection is made between the contacts.
Figure 27:
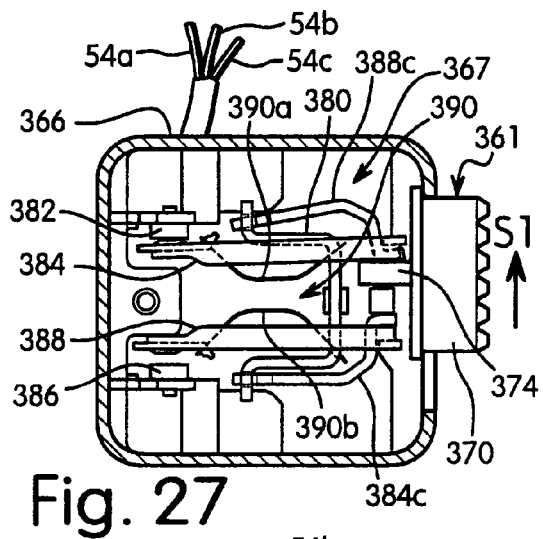
FIG. 27 is an elevational view of the electrical shift control switch illustrated in FIGS. 24–26 with the knob removed to shown the electrical shift control switch in the upshift position, i.e., one of the movable contacts one of the stationary contacts so that an electrical connection is established between the contacts.
Figure 28:
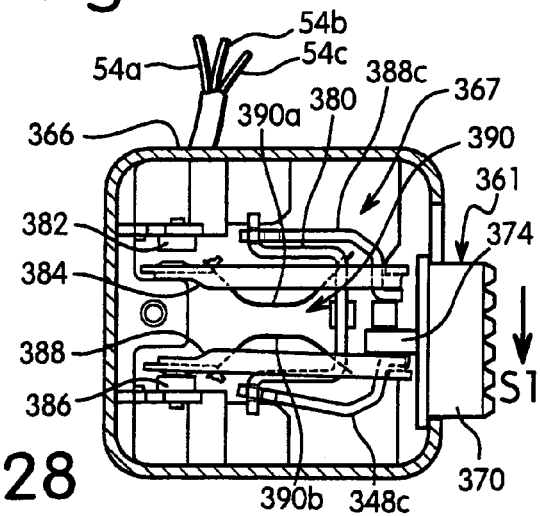
FIG. 28 is an elevational view of the electrical shift control switch illustrated in FIGS. 24–27 with the cover and dial removed to shown the electrical shift control switch in the downshift position, i.e., one of the movable contacts one of the stationary contacts so that an electrical connection is established between the contacts.

The operating member 361 protrudes out between the base 364 and the cover 366 of the housing 360 such that sliding movement of the operating member 361 causes the electrical contact assembly 362 to move from a normal or rest position to one of the two actuating positions as explained below. In this embodiment, the operating member 361 extends outwardly past the outside edge of the brake lever 32 as seen in FIG. 23. Thus, the rider can easily operate the electrical shift control switch 336 by sliding the operating member 361 up or down from the normal or rest position. When the operating member 361 is moved vertically in an upward direction, an upshift signal is sent to the cycle computer 24 for upshifting the derailleur 20. When the operating member 361 is moved vertically in a downward direction, a downshift signal is sent to the cycle computer 24 for downshifting the derailleur 20. Of course, the electrical shift control switch 336 can be utilized for both upshifting and downshifting the derailleur 16 when the electrical shift control switch 336 is mounted on the right hand side control device.

The operating member 361 basically has a knob or button 370 with a toggle member 374 integrally formed with the knob 370. The inner end of the toggle member 374 is configured and arranged to operate the electrical contact assembly 362 in the same manner as the first embodiment. Thus, sliding movement of the knob 370 by the rider causes the toggle member 374 to slide up or down therewith along a shift path S1. Preferably, the shift path S1 of the operating member 361 is parallel to the brake lever operating plane P of the brake lever 32. Thus, the shift path S1 of the operating member 361 is substantially perpendicular or orthogonally arranged relative to the brake pivot axis A1.

The electrical contact assembly 362 preferably includes a common contact bar 380, a first stationary contact 382, a first movable (upshift) contact 384, a second stationary contact 386, a second movable (downshift) contact 388 and a biasing element 390 formed of a pair of leaf springs 390a and 390b. Generally, when the first electrical shift control switch 336 is in a rest position, the toggle member 374 of the operating member 361 is located centrally between the first and second movable contacts 384 and 388. In particular, the biasing element 390 holds the toggle member 374 of the operating member 361 in a rest position between the first and second movable contacts 384 and 388. However, when the rider slides the knob 370 of the operating member 361 along the shift path S1, this sliding movement causes the toggle member 374 to slide against one of the movable contacts 384 and 388. This sliding movement of the toggle member 374 causes one of the movable contacts 382 and 388 to be deflected such that the deflected movable contact directly contacts the corresponding one of the stationary contacts 382 and 386. More specifically, when the knob 370 of the operating member 361 is moved in a vertically upward direction, the toggle member 374 deflects the first movable contact 384 such that the first movable contact 384 contacts the first stationary contact 382. Thus, an electrical connection is made between the first stationary contact 382 and the first movable contact 384 such that an upshift control signal is sent to the cycle computer 24, which in turn operates the derailleur 20 to cause an upshift to occur. If the knob 370 of the operating member 361 is moved in a vertically downward direction, a downshift of the derailleur 20 occurs. In particular, sliding movement of the knob 370 of the operating member 361 causes the toggle member 374 to deflect the second movable contact 388 against the second stationary contact 386 to result in an electrical connection therebetween. This electrical connection causes a control signal to be inputted into the cycle computer 24 such that a downshift control signal is sent to the derailleur 20. Of course, the electrical shift control switch 336 can be utilized for both upshifting and downshifting the derailleur 16 when the electrical shift control switch 336 is mounted on the right hand side control device.

The cycle computer 24 is electrical coupled to the first electrical shift control switch 336 via the electrical cord 54. In particular, the first electrical conductor 54a of the electrical cord 54 is electrically connected to the common contact bar 380. The second electrical conductor 54b of the electrical cord 54 is electrically connected to the first stationary contact 382, while the third electrical conductor 54c of the electrical cord 54 is electrically connected the second stationary contact 386. When the first contacts 382 and 384 are touching, the first conductor 54a is electrically connected to the second electrical conductor 54b to transmit an upshift control signal to the cycle computer 24. On the other hand, when the second contacts 386 and 388 are touching, the first conductor 54a is electrically connected to the third electrical conductor 54c to transmit a downshift control signal to the cycle computer 24.

Basically, the contacts 382, 384, 386 and 388 are constructed and operate in the same manner as the contacts 82, 84, 86 and 88 of the first embodiment. Thus, the descriptions of the contacts 82, 84, 86 and 88 of the first embodiment apply to the contacts 382, 384, 386 and 388. Likewise, the biasing element 390 is constructed and operates in the same manner as the biasing element 90 of the first embodiment. Thus, the description of the biasing element 390 of the first embodiment applies to the biasing element 90.

The second electrical shift control switch 338 is fixedly coupled to the inner side wall of the brake lever bracket 30 to side along a shift path S2. Thus, the shift path S2 of the operating member 361 is substantially perpendicular or orthogonally arranged relative to the brake pivot axis A1. The second electrical shift control switch 338 is either identical to the first electrical shift control switch 336 or the housing of the second electrical shift control switch 338 is modified to provided a more integrated housing control switch. Preferably, the gripping body 40 of the brake lever bracket 30 forms a part of the housing of the second electrical shift control switch 338. Thus, other than the possible modification to the housing of the second electrical shift control switch 338, the first and second electrical shift control switches 336 and 338 operate in an identical manner. Of course, the second electrical shift control switch 338 has its slides in a different direction from the first electrical shift control switch 336.

General Interpretation of Terms for the Embodiments

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% to 10% of the modified term if this deviation would not negate the meaning of the word it modifies. The term "actuating position" as used herein means a state in which an electrical connection is formed by an orientation of an operation member. The term "neutral position" as used herein means a state in which an electrical connection is not formed by an orientation of an operation member.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A shift and brake control device comprising:
   a brake lever bracket configured to be mounted to a handlebar;
   a brake lever coupled to the brake lever bracket to move along a brake operating plane; and
   an electrical shift control switch fixedly mounted to the brake lever, the electrical shift control switch including an operating member arranged and configured to rotate relative to the brake lever between a first actuating position and a second actuating position about a pivot axis that is substantially parallel to the brake operating plane, the pivot axis being stationary relative to the brake lever.

2. The shift and brake control device according to claim 1, wherein
   the electrical shift control switch is further arranged and configured to include a neutral position with the operating member being further arranged and configured to move relative to the brake lever between the neutral position and the first and second actuating positions.

3. The shift and brake control device according to claim 2, wherein
   the electrical shift control switch further includes a biasing element arranged and configured to urge the operating member to the neutral position.

4. The shift and brake control device according to claim 2, wherein
   the operating member includes a first actuating protrusion protruding outwardly to a first free end spaced from the pivot axis, and a second actuating protrusion protruding outwardly to a second free end spaced from the pivot axis.

5. The shift and brake control device according to claim 4, wherein
   the brake lever has a pair of outer lateral surfaces that are substantially parallel to the brake operating plane, and at least one of the first and second actuating protrusions lies completely between the outer lateral surfaces of the brake lever when the operating member is in the neutral position.

6. The shift and brake control device according to claim 4, wherein
the first and second free ends are circumferentially spaced from each other within an arc no larger than 180 degrees as measured about the pivot axis.

7. The shift and brake control device according to claim 1, wherein
the stationary pivot axis lies in the brake operating plane of the brake lever in which the brake lever is arranged to move between a rest position and a braking position.

8. The shift and brake control device according to claim 1, further comprising
an additional electrical shift control switch fixedly mounted to the brake lever bracket.

9. The shift and brake control device according to claim 1, wherein
the electrical shift control switch further includes
a first stationary contact having a first stationary engagement surface,
a first movable contact having a first movable engagement surface, the first movable contact being arranged and configured to be moved by the operating member such that the first movable engagement surface moves into electrical engagement with the first stationary engagement surface upon movement of the operating member to the first actuating position,
a second stationary contact having a second stationary engagement surface, and
a second movable contact having a second movable engagement surface, the second movable contact being arranged and configured to be moved by the operating member such that the second movable engagement surface moves into electrical engagement with the second stationary engagement surface upon movement of the operating member to the second actuating position.

10. The shift and brake control device according to claim 9, wherein
the electrical shift control switch further includes a biasing element arranged and configured to urge the operating member to a neutral position.

11. The shift and brake control device according to claim 9, wherein
the electrical shift control switch further includes a clicking structure arranged and configured to produce an audible sound upon selective movement of the operating member to either of the first and second actuating positions.

12. The shift and brake control device according to claim 9, wherein
the first movable contact is arranged to remain stationary relative to the operating member when the second movable contact is moved, and the second movable contact is arranged to remain stationary relative to the operating member when the first movable contact is moved.

13. The shift and brake control device according to claim 1, wherein
the electrical shift control switch further includes
a first stationary contact having a first stationary engagement surface,
a second stationary contact having a second stationary engagement surface, and
a movable contact having a movable engagement surface, the movable contact being arranged and configured to be moved by the operating member such that the movable engagement surface selectively moves into electrical engagement with the first stationary engagement surface upon movement of the operating member to the first actuating position, and moves into electrical engagement with the second stationary engagement surface upon movement of the operating member to the second actuating position.

14. The shift and brake control device according to claim 13, wherein
the movable contact is arranged and configured such that the movable engagement surface moves into electrical engagement with the first stationary engagement surface with the movable engagement surface sliding across the first stationary engagement surface when the operating member moves to the first actuating position, and moves into electrical engagement with the second stationary engagement surface with the movable engagement surface sliding across the second stationary engagement surface when the operating member moves to the second actuating position.

15. The shift and brake control device according to claim 13, wherein
the movable contact is fixedly coupled to the operating member to rotate with the operating member about the pivot axis of the operating member.

16. The shift and brake control device according to claim 1, wherein
the operating member includes a shaft having an outer end with a user engagement element coupled thereto and an inner end configured and arranged to selectively move a pair of movable contacts into engagement with a pair of stationary contacts.

17. The shift and brake control device according to claim 16, wherein
one of the movable contacts is arranged to remain stationary relative to the operating member when the other of the movable contacts is moved.

18. A shift and brake control device comprising:
a brake lever bracket configured to be mounted to a handlebar;
a brake lever coupled to the brake lever bracket to move along a brake operating plane; and
an electrical shift control switch fixedly mounted to the brake lever, the electrical shift control switch including an operating member arranged and configured to rotate relative to the brake lever about a pivot axis that is not perpendicular to the brake operating plane,
the operating member including first and second actuating protrusions protruding outwardly with the first actuating protrusion having a first free end located farther from the pivot axis than a second free end of the second actuating protrusion.

19. The shift and brake control device according to claim 18, wherein
the pivot axis is stationary relative to the brake lever.

20. The shift and brake control device according to claim 18, wherein
the pivot axis is substantially parallel with respect to the brake operating plane.

21. The shift and brake control device according to claim 18, wherein
the electrical shift control switch is further arranged and configured to include a first actuating position and a second actuating position, the operating member being further arranged and configured to move between the first and second actuating positions.

22. The shift and brake control device according to claim 21, wherein
the electrical shift control switch further includes a biasing element arranged and configured to urge the operating member to a neutral position located between the first and second actuating positions.

23. The shift and brake control device according to claim 22, wherein
the brake lever has a pair of outer lateral surfaces that are substantially parallel to the brake operating plane, and at least one of the first and second actuating protrusions lies completely between the outer lateral surfaces of the brake lever when the operating member is in the neutral position.

24. The shift and brake control device according to claim 23, wherein
the first and second free ends are circumferentially spaced from each other within an arc no larger than 180 degrees as measured about the pivot axis.

25. The shift and brake control device according to claim 21, wherein
the electrical shift control switch further includes
a first stationary contact having a first stationary engagement surface,
a first movable contact having a first movable engagement surface, the first movable contact being arranged and configured to be moved by the operating member such that the first movable engagement surface moves into electrical engagement with the first stationary engagement surface upon movement of the operating member to a first actuating position,
a second stationary contact having a second stationary engagement surface, and
a second movable contact having a second movable engagement surface, the second movable contact being arranged and configured to be moved by the operating member such that the second movable engagement surface moves into electrical engagement with the second stationary engagement surface upon movement of the operating member to a second actuating position.

26. The shift and brake control device according to claim 25, wherein
the electrical shift control switch further includes a biasing element arranged and configured to urge the operating member to a neutral position.

27. The shift and brake control device according to claim 25, wherein
the electrical shift control switch further includes a clicking structure arranged and configured to produce an audible sound upon selective movement of the operating member to either of the first and second actuating positions.

28. The shift and brake control device according to claim 25, wherein
the first movable contact is arranged to remain stationary relative to the operating member when the second movable contact is moved, and the second movable contact is arranged to remain stationary relative to the operating member when the first movable contact is moved.

29. The shift and brake control device according to claim 21, wherein
the electrical shift control switch further includes
a first stationary contact having a first stationary engagement surface,
a second stationary contact having a second stationary engagement surface, and
a movable contact having a movable engagement surface, the movable contact being arranged and configured to be moved by the operating member such that the movable engagement surface selectively moves into electrical engagement with the first stationary engagement surface upon movement of the operating member to the first actuating position, and moves into electrical engagement with the second stationary engagement surface upon movement of the operating member to the second actuating position.

30. The shift and brake control device according to claim 29, wherein
the movable contact is arranged and configured such that the movable engagement surface moves into electrical engagement with the first stationary engagement surface with the movable engagement surface sliding across the first stationary engagement surface when the operating member moves to the first actuating position, and moves into electrical engagement with the second stationary engagement surface with the movable engagement surface sliding across the second stationary engagement surface when the operating member moves to the second actuating position.

31. The shift and brake control device according to claim 30, wherein
the movable contact is fixedly coupled to the operating member to rotate about a rotationally operating axis of the operating member.

32. The shift and brake control device according to claim 18, further comprising
an additional electrical shift control switch fixedly mounted to the brake lever bracket.

33. The shift and brake control device according to claim 32, wherein
the additional electrical shift control switch includes an additional operating member arranged and configured to operate substantially identically as the operating member of the electrical shift control switch mounted to the brake lever.

34. The shift and brake control device according to claim 32, wherein
the additional electrical shift control switch is fixedly mounted to a lateral side of the brake lever bracket.

35. The shift and brake control device according to claim 34, wherein
the additional electrical shift control switch includes an additional operating member arranged and configured to operate substantially identically as the operating member of the electrical shift control switch mounted to the brake lever.

36. The shift and brake control device according to claim 18, wherein
the first and second free ends are circumferentially spaced from each other within an arc no larger than 180 degrees as measured about the pivot axis.

37. The shift and brake control device according to claim 18, wherein
the operating member includes a shaft having an outer end with a user engagement element coupled thereto and an inner end configured and arranged to selectively move a pair of movable contacts into engagement with a pair of stationary contacts.

38. The shift and brake control device according to claim 37, wherein
one of the movable contacts is arranged to remain stationary relative to the operating member when the other of the movable contacts is moved.

39. A shift and brake control device comprising:
a brake lever bracket configured to be mounted to a handlebar;
a brake lever coupled to the brake lever bracket to move along a brake operating plane, the brake lever having a pair of outer lateral surfaces that are substantially parallel to the brake operating plane; and
an electrical shift control switch fixedly mounted to the brake lever, the electrical shift control switch including an operating member arranged and configured to rotate relative to the brake lever between a rest position and at least one actuating position about a pivot axis that is not perpendicular to the brake operating plane,
the operating member including a first actuating protrusion having a first free end spaced from the pivot axis and a second actuating protrusion having a second free end spaced from the pivot axis, at least one of the first and second actuating protrusions lying completely between the outer lateral surfaces of the brake lever when the operating member is in the rest position.

40. A shift and brake control device comprising:
a brake lever bracket configured to be mounted to a handlebar;
a brake lever coupled to the brake lever bracket to move along a brake operating plane; and
an electrical shift control switch fixedly mounted to the brake lever, the electrical shift control switch including an operating member arranged and configured to rotate relative to the brake lever between a rest position and at least one actuating position about a pivot axis that is not perpendicular to the brake operating plane,
the operating member including a first actuating protrusion having a first free end spaced from the pivot axis and a second actuating protrusion having a second free end spaced from the pivot axis, the first and second free ends being circumferentially spaced from each other within an arc no larger than 180 degrees as measured about the pivot axis.

41. A shift and brake control device comprising:
a brake lever bracket configured to be mounted to a handlebar;
a brake lever coupled to the brake lever bracket to move along a brake operating plane; and
an electrical shift control switch including an operating member, the electrical shift control switch being
mounted to the brake lever with the operating member of the electrical shift control switch arranged and configured to rotate relative to the brake lever about a pivot axis that is not perpendicular to the brake operating plane;
the electrical shift control switch including
a first stationary contact having a first stationary engagement surface,
a first movable contact having a first movable engagement surface, the first movable contact being arranged and configured to be moved by the operating member such that the first movable engagement surface moves into electrical engagement with the first stationary engagement surface upon movement of the operating member to the first actuating position,
a second stationary contact having a second stationary engagement surface, and
a second movable contact having a second movable engagement surface, the second movable contact being arranged and configured to be moved by the operating member such that the second movable engagement surface moves into electrical engagement with the second stationary engagement surface upon movement of the operating member to the second actuating position,
the first movable contact being arranged to remain stationary relative to the operating member when the second movable contact is moved, and the second movable contact being arranged to remain stationary relative to the operating member when the first movable contact is moved.

42. The shift and brake control device according to claim 41, wherein
the electrical shift control switch further includes a biasing element arranged and configured to urge the operating member to a neutral position.

43. The shift and brake control device according to claim 41, wherein
the electrical shift control switch further includes a clicking structure arranged and configured to produce an audible sound upon selective movement of the operating member to either of the first and second actuating positions.

44. The shift and brake control device according to claim 41, wherein
the operating member includes a shaft having an outer end with a user engagement element coupled thereto and an inner end configured and arranged to selectively move a pair of movable contacts into engagement with a pair of stationary contacts.

45. A shift and brake control device comprising:
a brake lever bracket configured to be mounted to a handlebar;
a brake lever coupled to the brake lever bracket to move along a brake operating plane; and
an electrical shift control switch including an operating member, the electrical shift control switch being
mounted to the brake lever with the operating member of the electrical shift control switch arranged and configured to rotate relative to the brake lever about a pivot axis that is not perpendicular to the brake operating plane;
the operating member of the electrical shift control switch including a shaft having an outer end with a user engagement element coupled thereto and an inner end configured and arranged to selectively move a pair of movable contacts into engagement with a pair of stationary contacts.

46. The shift and brake control device according to claim 45, wherein
one of the movable contacts is arranged to remain stationary relative to the operating member when the other of the movable contacts is moved.

* * * * *